(12) United States Patent
Jin et al.

(10) Patent No.: US 11,419,013 B2
(45) Date of Patent: Aug. 16, 2022

(54) COMMUNICATION PATH SWITCHING METHOD AND DEVICE

(71) Applicant: Huawei Technologies Co., Ltd., Shenzhen (CN)

(72) Inventors: Hui Jin, Beijing (CN); Guowei Ouyang, Beijing (CN); Guorong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 16/312,103

(22) PCT Filed: Jun. 22, 2016

(86) PCT No.: PCT/CN2016/086774
§ 371 (c)(1),
(2) Date: Dec. 20, 2018

(87) PCT Pub. No.: WO2017/219289
PCT Pub. Date: Dec. 28, 2017

(65) Prior Publication Data
US 2019/0246438 A1 Aug. 8, 2019

(51) Int. Cl.
*H04W 4/00* (2018.01)
*H04W 36/00* (2009.01)
(Continued)

(52) U.S. Cl.
CPC ......... *H04W 36/0055* (2013.01); *H04W 8/08* (2013.01); *H04W 36/36* (2013.01); *H04W 76/11* (2018.02); *H04W 88/04* (2013.01)

(58) Field of Classification Search
CPC ....... H04W 76/11; H04W 8/08; H04W 36/00; H04W 36/36; H04W 88/04;
(Continued)

(56) References Cited

U.S. PATENT DOCUMENTS 6,825,830 B1 * 11/2004 Kanesaka .............. G08B 5/228
345/156
8,730,918 B2 * 5/2014 Huang .................. H04W 36/12
370/331
(Continued)

FOREIGN PATENT DOCUMENTS

CN 103037450 A 4/2013
CN 103716850 A 4/2014
(Continued)

OTHER PUBLICATIONS

Machine Translation and Abstract of Chinese Publication No. CN105307220, Feb. 3, 2016, 24 pages.
(Continued)

*Primary Examiner* — Stephen M D Agosta
(74) *Attorney, Agent, or Firm* — Conley Rose, P.C.

(57) ABSTRACT

A communication path switching method and device, where the method includes receiving, by a first base station, a first message from a first terminal, where the first message requesting to switch the first terminal from a first path for independently accessing a network to a second path for accessing the network using a second terminal, and the first base station serves the first terminal, determining, by the first base station according to the first message, a second base station serving the second terminal, obtaining, by the first base station, configuration information from the second base station, where the configuration information enabling the first terminal to access the network using the second terminal, and sending, by the first base station, the configuration information to the first terminal. Therefore, communication path switching for different complex application scenarios can be implemented.

16 Claims, 26 Drawing Sheets

(51) Int. Cl.
*H04W 36/36* (2009.01)
*H04W 88/04* (2009.01)
*H04W 76/11* (2018.01)
*H04W 8/08* (2009.01)

(58) Field of Classification Search
CPC . H04L 65/1006; H04L 65/1083; H04L 65/80; H04B 7/2606; H04B 7/155; H04B 7/15; H04B 7/024; H04B 7/0413; H04B 7/063; H04B 7/0695; H04B 7/088; H04B 7/15507; H04J 11/00; H04J 13/00
See application file for complete search history.

(56) References Cited

U.S. PATENT DOCUMENTS

| | | | |
|---|---|---|---|
| 8,804,596 B2* | 8/2014 | Cai | H04W 36/0033 370/315 |
| 8,989,807 B2* | 3/2015 | Schmidt | H04J 11/003 455/552.1 |
| 9,445,446 B2* | 9/2016 | Wei | H04W 76/14 |
| 9,706,589 B2* | 7/2017 | Fodor | H04W 72/1215 |
| 9,756,609 B2* | 9/2017 | Seo | H04W 72/042 |
| 10,069,557 B2* | 9/2018 | Yi | H04W 40/22 |
| 2006/0168343 A1* | 7/2006 | Ma | H04W 52/38 709/245 |
| 2010/0208697 A1* | 8/2010 | Hori | H04W 28/18 370/331 |
| 2010/0322193 A1* | 12/2010 | Hu | H04W 40/36 370/331 |
| 2011/0038284 A1* | 2/2011 | Senarath | H04B 7/155 370/279 |
| 2011/0258327 A1* | 10/2011 | Phan | H04W 16/10 709/227 |
| 2012/0051322 A1 | 3/2012 | Huang et al. | |
| 2013/0102314 A1* | 4/2013 | Koskela | H04W 36/16 455/436 |
| 2013/0201904 A1* | 8/2013 | Toskala | H04W 36/165 370/315 |
| 2013/0225180 A1* | 8/2013 | Lim | H04W 36/32 455/440 |
| 2013/0229939 A1* | 9/2013 | Teyeb | H04W 36/30 370/252 |
| 2013/0337811 A1* | 12/2013 | Faerber | H04W 36/0083 455/436 |
| 2014/0213250 A1* | 7/2014 | Baek | H04W 8/005 455/434 |
| 2014/0226629 A1* | 8/2014 | Kim | H04W 24/02 370/331 |
| 2014/0308954 A1* | 10/2014 | Wang | H04W 36/165 455/436 |
| 2014/0335861 A1* | 11/2014 | De Benedittis | H04W 36/0061 455/436 |
| 2015/0163705 A1* | 6/2015 | Lu | H04W 36/0055 370/331 |
| 2015/0208421 A1* | 7/2015 | Agiwal | H04W 36/0072 455/436 |
| 2015/0215767 A1* | 7/2015 | Siomina | H04W 76/14 455/435.2 |
| 2015/0289304 A1 | 10/2015 | Liang et al. | |
| 2015/0312832 A1* | 10/2015 | Huang | H04W 36/0055 370/338 |
| 2015/0312836 A1* | 10/2015 | Fukuta | H04W 36/38 455/438 |
| 2015/0334757 A1* | 11/2015 | Seo | H04W 76/19 370/329 |
| 2015/0341772 A1* | 11/2015 | Liang | H04W 8/005 455/434 |
| 2015/0358869 A1 | 12/2015 | Byun et al. | |
| 2016/0037399 A1* | 2/2016 | Li | H04W 76/23 455/436 |
| 2016/0242080 A1* | 8/2016 | Vikberg | H04W 76/15 |
| 2016/0249377 A1 | 8/2016 | Zhe et al. | |
| 2017/0086252 A1* | 3/2017 | Chai | H04W 76/14 |
| 2018/0092017 A1* | 3/2018 | Freda | H04W 76/23 |
| 2018/0092022 A1* | 3/2018 | Huang | H04W 76/38 |
| 2018/0109985 A1* | 4/2018 | Huang | H04W 36/0094 |
| 2018/0160338 A1* | 6/2018 | Huang | H04W 8/24 |
| 2020/0092685 A1* | 3/2020 | Fehrenbach | H04B 7/2606 |

FOREIGN PATENT DOCUMENTS

| | | |
|---|---|---|
| CN | 104254145 A | 12/2014 |
| CN | 104995957 A | 10/2015 |
| CN | 105307220 A | 2/2016 |
| CN | 105592509 A | 5/2016 |
| CN | 105657643 A | 6/2016 |
| EP | 2903390 A1 | 8/2015 |
| EP | 2991440 A1 | 3/2016 |
| WO | 2015003590 A1 | 1/2015 |

OTHER PUBLICATIONS

Machine Translation and Abstract of Chinese Publication No. CN105592509, May 18, 2016, 25 pages.
Machine Translation and Abstract of Chinese Publication No. CN105657643, Jun. 8, 2016, 20 pages.
Foreign Communication From a Counterpart Application, Chinese Application No. 201680080611 9, Chinese Office Action dated Dec. 2, 2019, 12 pages.
"3rd Generation Partnership Project; Technical Specification Group Core Network and Terminals; Proximity-services (ProSe) User Equipment (UE) to ProSe function protocol aspects; Stage 3 (Release 12)," 3GPP TS 24.334, V12.5.0, Dec. 2015, 94 pages.
Machine Translation and Abstract of Chinese Publication No. CN104254145, Dec. 31, 2014, 48 pages.
Machine Translation and Abstract of International Publication No. WO2015003590, Jan. 15, 2015, 63 pages.
Foreign Communication From a Counterpart Application, PCT Application No. PCT/CN2016/086774, English Translation of International Search Report dated Feb. 27, 2017, 2 pages.
Ericsson, "ProSe UE-Network Relaying and Service Continuity Concept," XP050937363, R3-150752, 3GPP TSG-RAN WG3 #87bis, Apr. 20-24, 2015, 4 pages.
Foreign Communication From A Counterpart Application, European Application No. 16905831.0, Extended European Search Report dated Apr. 16, 2019, 11 pages.

* cited by examiner

COMMUNICATION PATH SWITCHING METHOD AND DEVICE

CROSS-REFERENCE TO RELATED APPLICATIONS

This application is a U.S. National Stage of International Patent Application No. PCT/CN2016/086774 filed on Jun. 22, 2016, which is hereby incorporated by reference in its entirety.

TECHNICAL FIELD

The present invention relates to the field of communications technologies, and in particular, to a communication path switching method and device.

BACKGROUND

The smartphone industry has been mature, the market is becoming saturated, and wearable devices (wearable device, WD) are one of future strategic development directions of companies.

Currently, a watch on which a subscriber identity module (Subscriber Identity Module, SIM) card can be installed is launched in the industry, and the watch can be directly connected to a network. When the WD is directly connected to the network, a battery and an antenna in the WD are main research issues of the WD because of a relatively small size of the WD. Details are as follows:

First, because the battery in the WD has a small capacity, direct network communication with a base station causes fast battery consumption and short standby time.

Second, because the WD generally has a special shape, the antenna is difficult to design, and currently only a single antenna can be implemented. Therefore, to send a same amount of data, the WD consumes more time and more network resources than a multi-antenna device.

Therefore, currently, a high-performance mobile phone needs to be configured around the WD in most of the time, so that the WD accesses the network by using the mobile phone. Specifically, a basic concept of switching from a direct path (direct path) for independently accessing the network by the WD to an indirect path (indirect path) for accessing the network by using a relay terminal (relay UE) is as follows: After the WD independently accesses the network, if the WD finds that there is relay UE nearby, the WD sends a request to an evolved NodeB (evolved NodeB, eNB). The eNB generates configuration information for the relay UE, and the configuration information is used to reconfigure the relay UE, so that the relay UE forwards user plane data and/or control plane data for the WD. The eNB generates configuration information for the WD, and the configuration information is used to reconfigure the WD, so that the WD sends the user plane data and/or the control plane data to the network by using the relay UE. According to this solution, power of the WD can be saved and transmission efficiency of the WD is increased. However, the solution is applicable only to a case in which the WD and the relay UE camp on a same eNB, and in another complex application scenario, communication path switching cannot be implemented through simple reconfiguration.

SUMMARY

Embodiments of the present invention provide a communication path switching method and device, so as to implement communication path switching in a complex application scenario.

Specific technical solutions provided in the embodiments of the present invention are as follows:

According to a first aspect, a communication path switching method is provided, including:

receiving, by a first base station, a first message sent by a first terminal, where the first message is used to request to switch the first terminal from a first path for independently accessing a network to a second path for accessing the network by using a second terminal, and the first base station serves the first terminal;

determining, by the first base station according to the first message, a second base station that serves the second terminal;

obtaining, by the first base station, configuration information from the second base station, where the configuration information is used by the first terminal to access the network by using the second terminal; and sending, by the first base station, the configuration information to the first terminal.

Therefore, in the method provided in this embodiment of the present invention, when base stations that serve the first terminal and the second terminal are different, the first terminal can access the network by using the second terminal.

In an optional design, the first message includes a cell identifier of a cell in which the second terminal is located.

In an optional design, the first message further includes an identifier of the second terminal, and the identifier of the second terminal is used by the second base station to determine the second terminal and configure the second terminal, so that the first terminal can access the network by using the second terminal.

In an optional design, the determining, by the first base station according to the first message, a second base station that serves the second terminal includes:

determining, by the first base station, the second base station according to the cell identifier of the cell in which the second terminal is located.

In an optional design, the obtaining, by the first base station, configuration information from the second base station includes:

sending, by the first base station, a second message to the second base station, where the second message is used to notify the second base station that the first terminal requests to access the network by using the second terminal; and receiving, by the first base station, the configuration information sent by the second base station, where the configuration information is generated by the second terminal for the first terminal.

Therefore, in this embodiment of the present invention, when base stations that serve the first terminal and the second terminal are different and a same MME serves the first terminal and the second terminal, the first terminal can access the network by using the second terminal.

In an optional design, the second message includes switch indication information and the identifier of the second terminal, and the switch indication information is used to indicate that the first terminal requests to access the network by using another terminal.

In an optional design, the obtaining, by the first base station, configuration information from the second base station includes:

sending, by the first base station, a third message to an MME that serves the first terminal, where the third message is used to notify the MME that the first terminal requests to access the network by using the second terminal; and receiving, by the first base station, the configuration information sent by the MME that serves the first terminal, where the configuration information is obtained from the second base station by the MME that serves the first terminal.

Therefore, in this embodiment of the present invention, when base stations that serve the first terminal and the second terminal are different and MMEs that serve the first terminal and the second terminal are different, the first terminal can access the network by using the second terminal.

In an optional design, the third message includes the switch indication information and the identifier of the second terminal.

In an optional design, that the configuration information is obtained from the second base station by the MME that serves the first terminal includes:

the MME that serves the first terminal sends, according to the identifier of the second terminal, a fourth message to an MME that serves the second terminal, where the fourth message is used to cause the MME that serves the second terminal to send a fifth message to the second base station, and the fifth message is used to notify the second base station that the first terminal requests to access the network by using the second terminal; and the MME that serves the first terminal receives the configuration information sent by the second base station by using the MME that serves the second terminal, where the configuration information is generated by the second terminal for the first terminal.

In an optional design, the identifier of the second terminal includes a globally unique temporary identity GUTI of the second terminal, or an S-temporary mobile subscriber identity S-TMSI of the second terminal, or a temporary identifier allocated by the second base station to the second terminal.

According to a second aspect, a communication path switching method is provided, including:

sending, by the first terminal, a first message to a first base station when determining that the first terminal needs to switch from a first path for independently accessing a network to a second path for accessing the network by using the second terminal, where the first base station serves the first terminal, and the first message is used to request to switch the first terminal from the first path to the second path;

receiving, by the first terminal, configuration information sent by the first base station, where the configuration information is used by the first terminal to access the network by using the second terminal, the configuration information is obtained by the first base station from a second base station, and the second base station serves the second terminal; and accessing, by the first terminal, the network by using the configuration information and the second terminal.

Therefore, in the method provided in this embodiment of the present invention, when base stations that serve the first terminal and the second terminal are different, the first terminal can access the network by using the second terminal.

In an optional design, before the sending, by the first terminal, a first message to a first base station, the method further includes:

obtaining, by the first terminal, a cell identifier of a cell in which the second terminal is located, or a cell identifier of a cell in which the second terminal is located and an identifier of the second terminal.

In an optional design, the first message includes the cell identifier of the cell in which the second terminal is located.

In an optional design, the first message further includes the identifier of the second terminal, and the identifier of the second terminal is used by the second base station to determine the second terminal and configure the second terminal, so that the first terminal can access the network by using the second terminal.

In an optional design, the accessing, by the first terminal, the network by using the configuration information and the second terminal includes:

setting up, by the first terminal, a radio bearer with the second terminal according to radio resource information that is used by the first terminal to set up the radio bearer with the second terminal and that is allocated by the second base station, where the configuration information includes the radio resource information.

In an optional design, after the accessing, by the first terminal, the network by using the configuration information and the second terminal, the method further includes:

sending, by the first terminal, an acknowledgement message to the second base station by using the second terminal, where the acknowledgement message is used to notify the second base station that the first terminal completes switching from the first path to the second path.

In an optional design, the identifier of the second terminal includes a GUTI of the second terminal, or an S-TMSI of the second terminal, or a temporary identifier allocated by the second base station to the second terminal.

According to a third aspect, a communication path switching method is provided, including:

learning, by a second base station, that a first terminal requests to access a network by using a second terminal, where the second base station serves the second terminal;

generating, by the second base station, configuration information for the first terminal, where the configuration information is used by the first terminal to access the network by using the second terminal; and notifying, by the second base station, a first base station of the configuration information, where the first base station serves the first terminal.

Therefore, in the method provided in this embodiment of the present invention, when base stations that serve the first terminal and the second terminal are different, the first terminal can access the network by using the second terminal.

In an optional design, the learning, by a second base station, that a first terminal requests to access a network by using a second terminal includes:

receiving, by the second base station, a first message sent by the first base station, where the first message is used to notify the second base station that the first terminal requests to access the network by using the second terminal; and the notifying, by the second base station, a first base station of the configuration information includes:

directly sending, by the second base station, the configuration information to the first base station.

Therefore, in this embodiment of the present invention, when base stations that serve the first terminal and the second terminal are different and a same MME serves the first terminal and the second terminal, the first terminal can access the network by using the second terminal.

In an optional design, the first message includes switch indication information and an identifier of the second terminal, and the switch indication information is used to indicate that the first terminal requests to access the network by using another terminal.

In an optional design, the learning, by a second base station, that a first terminal requests to access a network by using a second terminal includes:

receiving, by the second base station, a second message sent by an MME that serves the second terminal, where the second message is used to notify the second base station that the first terminal requests to access the network by using the second terminal, and the second message is obtained from the first base station by the MME that serves the second terminal; and the notifying, by the second base station, a first base station of the configuration information includes:

sending, by the second base station, the configuration information to the first base station by using an MME that serves the first terminal and the MME that serves the second terminal.

Therefore, in this embodiment of the present invention, when base stations that serve the first terminal and the second terminal are different and MMEs that serve the first terminal and the second terminal are different, the first terminal can access the network by using the second terminal.

In an optional design, the second message includes the switch indication information and an identifier of the second terminal.

In an optional design, that the second message is obtained from the first base station by the MME that serves the second terminal includes:

the MME that serves the second terminal receives a third message sent by the MME that serves the first terminal, where the third message is sent after the MME that serves the first terminal receives a fourth message sent by the first base station, and the fourth message is used so that the MME that serves the first terminal can send, according to the identifier of the second terminal, the third message to the MME that serves the second terminal.

In an optional design, after the learning, by a second base station, that a first terminal requests to access a network by using a second terminal, and before the generating, by the second base station, configuration information for the first terminal, where the configuration information is used by the first terminal to access the network by using the second terminal, the method further includes:

sending, by the second base station to the MME that serves the second terminal, a request for allowing the first terminal to access the network by using the second terminal; and receiving, by the second base station, an acknowledgement message that is for allowing the first terminal to access the network by using the second terminal and that is sent by the MME that serves the second terminal.

Therefore, the second base station determines, according to an indication of the MME, whether the first terminal is allowed to access the network by using the second terminal.

In an optional design, after the sending, by the second base station, the configuration information to the first base station, the method further includes:

receiving, by the second base station, an acknowledgement message sent by the first terminal by using the second terminal, where the acknowledgement message is used to notify the second base station that the first terminal completes switching from the first path to the second path.

In an optional design, the identifier of the second terminal includes a GUTI of the second terminal, or an S-TMSI of the second terminal, or a temporary identifier allocated by the second base station to the second terminal.

According to a fourth aspect, a communication path switching method is provided, including:

receiving, by an MME, a first message sent by a first terminal, where the first message includes switch indication information and an identifier of the second terminal, the MME serves the first terminal, and the switch indication information is used to indicate that the first terminal requests to access a network by using another terminal;

determining, by the MME according to the identifier of the second terminal, a second base station that serves the second terminal, and sending a second message to the second base station, where the second message is used to notify the second base station that the first terminal requests to access the network by using the second terminal;

receiving, by the MME, configuration information sent by the second base station, where the configuration information is used by the first terminal to access the network by using the second terminal; and sending, by the MME, the configuration information to the first terminal.

Therefore, in this embodiment of the present invention, when base stations that serve the first terminal and the second terminal are different and the first terminal is in an idle state, the first terminal can access the network by using the second terminal.

In an optional design, the sending, by the MME, the configuration information to the first terminal includes:

sending, by the MME, a third message to the first terminal, where the third message carries the configuration information; or sending, by the MME, the configuration information to the first terminal by using a first base station, where the first base station serves the first terminal.

Therefore, in this embodiment of the present invention, when base stations that serve the first terminal and the second terminal are different and a same MME serves the first terminal and the second terminal, the first terminal can access, in an idle state, the network by using the second terminal.

In an optional design, the third message further carries switch acknowledgement indication information, and the switch acknowledgement indication information is used to indicate that the first terminal successfully sets up a second path for accessing the network by using the second terminal.

In an optional design, before the sending, by the MME, a second message to the second base station, the method further includes:

determining, by the MME, whether there is a pairing relationship between the second terminal and the first terminal, and if there is a pairing relationship between the second terminal and the first terminal, allowing the first terminal to access the network by using the second terminal.

Therefore, the MME may determine, according to whether pairing management of the first terminal and the second terminal is established in advance, whether to allow the first terminal to access the network by using the second terminal.

In an optional design, before the receiving, by an MME, a first message sent by a first terminal, the method further includes:

receiving, by the MME, a fourth message sent by the first terminal by using the first base station, where the fourth message is used to request the MME to serve the first terminal, and the fourth message is sent by the first terminal after the first terminal determines that the MME serving the first terminal is different from an MME serving the second terminal; and executing, by the MME, a tracking area update TAU process with the first terminal, so that the MME serves the first terminal.

Therefore, in this embodiment of the present invention, when base stations that serve the first terminal and the second terminal are different and MMEs that serve the first terminal and the second terminal are different, the first terminal can access, in an idle state, the network by using the second terminal.

In an optional design, the identifier of the second terminal includes a GUTI of the second terminal, or an S-TMSI of the second terminal, or a temporary identifier allocated by the second base station to the second terminal.

According to a fifth aspect, a communication path switching method is provided, including:

obtaining, by a first terminal, an identifier of a second terminal;

when determining, in an idle state, that the first terminal needs to set up a second path for accessing a network by using the second terminal, sending, by the first terminal, a first message to an MME that serves the first terminal, where the first message includes switch indication information and the identifier of the second terminal, and the switch indication information is used to indicate that the first terminal requests to access the network by using another terminal;

receiving, by the first terminal, configuration information obtained from a second base station by the MME that serves the first terminal, where the configuration information is used by the first terminal to access the network by using the second terminal, and the second base station serves the second terminal; and accessing, by the first terminal, the network by using the configuration information and the second terminal.

Therefore, in this embodiment of the present invention, when base stations that serve the first terminal and the second terminal are different, the first terminal can access, in the idle state, the network by using the second terminal.

In an optional design, the sending, by the first terminal, a first message to an MME that serves the first terminal includes:

when determining, according to the identifier of the second terminal, that an MME that serves the second terminal is the same as the MME that serves the first terminal, directly sending, by the first terminal, the first message to the MME that serves the first terminal.

Therefore, in this embodiment of the present invention, when base stations that serve the first terminal and the second terminal are different and a same MME serves the first terminal and the second terminal, the first terminal can access, in the idle state, the network by using the second terminal.

In an optional design, the sending, by the first terminal, a first message to an MME that serves the first terminal includes:

when determining, according to the identifier of the second terminal, that an MME that serves the second terminal is different from the MME that serves the first terminal, sending, by the first terminal by using a first base station, a second message to the MME that serves the second terminal, where the second message is used to request the MME that serves the second terminal to serve the first terminal, and the first base station serves the first terminal;

executing, by the first terminal, a tracking area update TAU process with the MME, so that the MME that serves the second terminal serves the first terminal; and after determining that the MME that serves the second terminal serves the first terminal, sending, by the first terminal, the first message to the MME that serves the first terminal.

Therefore, in this embodiment of the present invention, when base stations that serve the first terminal and the second terminal are different and MMEs that serve the first terminal and the second terminal are different, the first terminal can access, in the idle state, the network by using the second terminal.

In an optional design, the sending, by the first terminal by using a first base station, a second message to the MME that serves the second terminal includes:

sending, by the first terminal to the first base station, an identifier of the MME that serves the second terminal, so that the first base station sends, according to the identifier of the MME that serves the second terminal, the second message to the MME that serves the second terminal; where the identifier of the MME that serves the second terminal is obtained by the first terminal according to the identifier of the second terminal.

In an optional design, the second message is a tracking area update message, and an update type of the tracking area update message is path switching.

In an optional design, before the sending, by the first terminal, a first message to an MME that serves the first terminal, the method further includes:

camping on, by the first terminal according to a cell identifier of a cell in which the second terminal is located, the cell corresponding to the cell identifier.

In an optional design, the receiving, by the first terminal, configuration information obtained from a second base station by the MME that serves the first terminal includes:

receiving, by the first terminal, a third message sent by the MME that serves the first terminal, where the third message carries the configuration information; or receiving, by the first terminal, the configuration information sent, by using the first base station, by the MME that serves the first terminal.

In an optional design, the identifier of the second terminal includes a GUTI of the second terminal, or an S-TMSI of the second terminal, or a temporary identifier allocated by the second base station to the second terminal.

According to a sixth aspect, a communication path switching device is provided, including:

a transceiver;

a memory, configured to store an instruction; and a processor, separately connected to the transceiver and the memory, and configured to perform the following operations according to the instruction stored in the memory:

receiving a first message sent by a first terminal, where the first message is used to request to switch the first terminal from a first path for independently accessing a network to a second path for accessing the network by using a second terminal, and the device serves the first terminal;

determining, according to the first message, a second base station that serves the second terminal;

obtaining configuration information from the second base station, where the configuration information is used by the first terminal to access the network by using the second terminal; and sending the configuration information to the first terminal.

In an optional design, the first message includes a cell identifier of a cell in which the second terminal is located.

In an optional design, the first message further includes an identifier of the second terminal, and the identifier of the second terminal is used by the second base station to determine the second terminal and configure the second terminal, so that the first terminal can access the network by using the second terminal.

In an optional design, the processor is configured to:

when determining, according to the first message, the second base station that serves the second terminal, determine the second base station according to the cell identifier of the cell in which the second terminal is located.

In an optional design, the processor is configured to:

when obtaining the configuration information from the second base station, send a second message to the second base station, where the second message is used to notify the second base station that the first terminal requests to access the network by using the second terminal; and receive the configuration information sent by the second base station, where the configuration information is generated by the second terminal for the first terminal.

In an optional design, the second message includes switch indication information and the identifier of the second terminal, and the switch indication information is used to indicate that the first terminal requests to access the network by using another terminal.

In an optional design, the processor is configured to:

when obtaining the configuration information from the second base station, send a third message to an MME that serves the first terminal, where the third message is used to notify the MME that the first terminal requests to access the network by using the second terminal; and receive the configuration information sent by the MME that serves the first terminal, where the configuration information is obtained from the second base station by the MME that serves the first terminal.

In an optional design, the third message includes the switch indication information and the identifier of the second terminal.

In an optional design, that the configuration information is obtained from the second base station by the MME that serves the first terminal includes:

the MME that serves the first terminal sends, according to the identifier of the second terminal, a fourth message to an MME that serves the second terminal, where the fourth message is used to cause the MME that serves the second terminal to send a fifth message to the second base station, and the fifth message is used to notify the second base station that the first terminal requests to access the network by using the second terminal; and the MME that serves the first terminal receives the configuration information sent by the second base station by using the MME that serves the second terminal, where the configuration information is generated by the second terminal for the first terminal.

In an optional design, the identifier of the second terminal includes a GUTI of the second terminal, or an S-TMSI of the second terminal, or a temporary identifier allocated by the second base station to the second terminal.

According to a seventh aspect, a communication path switching device is provided, including:

a transceiver;

a memory, configured to store an instruction; and a processor, separately connected to the transceiver and the memory, and configured to perform the following operations according to the instruction stored in the memory:

sending a first message to a first base station when determining that the device needs to switch from a first path for independently accessing a network to a second path for accessing the network by using the second terminal, where the first base station serves the device, and the first message is used to request to switch the device from the first path to the second path;

receiving configuration information sent by the first base station, where the configuration information is used by the device to access the network by using the second terminal, the configuration information is obtained by the first base station from a second base station, and the second base station serves the second terminal; and accessing the network by using the configuration information and the second terminal.

In an optional design, the processor is configured to:

before sending the first message to the first base station, obtain a cell identifier of a cell in which the second terminal is located, or a cell identifier of a cell in which the second terminal is located and an identifier of the second terminal.

In an optional design, the first message includes the cell identifier of the cell in which the second terminal is located.

In an optional design, the first message further includes the identifier of the second terminal, and the identifier of the second terminal is used by the second base station to determine the second terminal and configure the second terminal, so that the device can access the network by using the second terminal.

In an optional design, the processor is configured to:

when accessing the network by using the configuration information and the second terminal, set up a radio bearer with the second terminal according to radio resource information that is used by the device to set up the radio bearer with the second terminal and that is allocated by the second base station, where the configuration information includes the radio resource information.

In an optional design, the processor is further configured to:

after the device accesses the network by using the configuration information and the second terminal, send an acknowledgement message to the second base station by using the second terminal, where the acknowledgement message is used to notify the second base station that the device completes switching from the first path to the second path.

In an optional design, the identifier of the second terminal includes a GUTI of the second terminal, or an S-TMSI of the second terminal, or a temporary identifier allocated by the second base station to the second terminal.

According to an eighth aspect, a communication path switching device is provided, including:

a transceiver;

a memory, configured to store an instruction; and a processor, separately connected to the transceiver and the memory, and configured to perform the following operations according to the instruction stored in the memory:

learning that a first terminal requests to access a network by using a second terminal, where the device serves the second terminal;

generating configuration information for the first terminal, where the configuration information is used by the first terminal to access the network by using the second terminal; and notifying a first base station of the configuration information, where the first base station serves the first terminal.

In an optional design, the processor is configured to:

when learning that the first terminal requests to access the network by using the second terminal, receive a first message sent by the first base station, where the first message is used to notify the device that the first terminal requests to access the network by using the second terminal; where the notifying a first base station of the configuration information includes:

directly sending the configuration information to the first base station.

In an optional design, the first message includes switch indication information and an identifier of the second terminal, and the switch indication information is used to indicate that the first terminal requests to access the network by using another terminal.

In an optional design, the processor is configured to:

when learning that the first terminal requests to access the network by using the second terminal, receive a second message sent by an MME that serves the second terminal, where the second message is used to notify the device that the first terminal requests to access the network by using the second terminal, and the second message is obtained from the first base station by the MME that serves the second terminal; where the notifying a first base station of the configuration information includes:

sending the configuration information to the first base station by using an MME that serves the first terminal and the MME that serves the second terminal.

In an optional design, the second message includes the switch indication information and an identifier of the second terminal.

In an optional design, that the second message is obtained from the first base station by the MME that serves the second terminal includes:

the MME that serves the second terminal receives a third message sent by the MME that serves the first terminal, where the third message is sent after the MME that serves the first terminal receives a fourth message sent by the first base station, and the fourth message is used so that the MME that serves the first terminal can send, according to the identifier of the second terminal, the third message to the MME that serves the second terminal.

In an optional design, the processor is further configured to:

after learning that the first terminal requests to access the network by using the second terminal, and before generating, for the first terminal, the configuration information that is used by the first terminal to access the network by using the second terminal, send, to the MME that serves the second terminal, a request for allowing the first terminal to access the network by using the second terminal; and receive an acknowledgement message that is for allowing the first terminal to access the network by using the second terminal and that is sent by the MME that serves the second terminal.

In an optional design, the processor is further configured to:

after sending the configuration information to the first base station, receive an acknowledgement message sent by the first terminal by using the second terminal, where the acknowledgement message is used to notify the device that the first terminal completes switching from the first path to the second path.

In an optional design, the identifier of the second terminal includes a GUTI of the second terminal, or an S-TMSI of the second terminal, or a temporary identifier allocated by the device to the second terminal.

According to a ninth aspect, a communication path switching device is provided, including:

a transceiver;

a memory, configured to store an instruction; and a processor, separately connected to the transceiver and the memory, and configured to perform the following operations according to the instruction stored in the memory:

receiving a first message sent by a first terminal, where the first message includes switch indication information and an identifier of the second terminal, the device serves the first terminal, and the switch indication information is used to indicate that the first terminal requests to access a network by using another terminal;

determining, according to the identifier of the second terminal, a second base station that serves the second terminal, and sending a second message to the second base station, where the second message is used to notify the second base station that the first terminal requests to access the network by using the second terminal;

receiving configuration information sent by the second base station, where the configuration information is used by the first terminal to access the network by using the second terminal; and sending the configuration information to the first terminal.

In an optional design, the processor is further configured to:

when sending the configuration information to the first terminal, send a third message to the first terminal, where the third message carries the configuration information; or send the configuration information to the first terminal by using a first base station, where the first base station serves the first terminal.

In an optional design, the third message further carries switch acknowledgement indication information, and the switch acknowledgement indication information is used to indicate that the first terminal successfully sets up a second path for accessing the network by using the second terminal.

In an optional design, the processor is further configured to:

before sending the second message to the second base station, determine whether there is a pairing relationship between the second terminal and the first terminal, and if there is a pairing relationship between the second terminal and the first terminal, allow the first terminal to access the network by using the second terminal.

In an optional design, the processor is further configured to:

before receiving the first message sent by the first terminal, receive a fourth message sent by the first terminal by using the first base station, where the fourth message is used to request the device to serve the first terminal, and the fourth message is sent by the first terminal after the first terminal determines that the MME serving the first terminal is different from an MME serving the second terminal; and execute a tracking area update TAU process with the first terminal, so that the device serves the first terminal.

In an optional design, the identifier of the second terminal includes a GUTI of the second terminal, or an S-TMSI of the second terminal, or a temporary identifier allocated by the second base station to the second terminal.

According to a tenth aspect, a communication path switching device is provided, including:

a transceiver;

a memory, configured to store an instruction; and a processor, separately connected to the transceiver and the memory, and configured to perform the following operations according to the instruction stored in the memory:

obtaining an identifier of a second terminal;

when determining, in an idle state, that the device needs to set up a second path for accessing a network by using the second terminal, sending a first message to an MME that serves the device, where the first message includes switch indication information and the identifier of the second terminal, and the switch indication information is used to indicate that the device requests to access the network by using another terminal;

receiving configuration information obtained from a second base station by the MME that serves the device, where the configuration information is used by the device to access the network by using the second terminal, and the second base station serves the second terminal; and accessing the network by using the configuration information and the second terminal.

In an optional design, the processor is configured to:

when sending the first message to the MME that serves the first terminal, and determining, according to the identifier of the second terminal, that an MME that serves the second terminal is the same as the MME that serves the device, directly send the first message to the MME that serves the device.

In an optional design, the processor is configured to:

when sending the first message to the MME that serves the first terminal, and determining, according to the identifier of the second terminal, that an MME that serves the second terminal is different from the MME that serves the device, send, by using a first base station, a second message to the MME that serves the second terminal, where the second message is used to request the MME that serves the second terminal to serve the device, and the first base station serves the device;

execute a tracking area update TAU process with the MME, so that the MME that serves the second terminal serves the device; and after determining that the MME that serves the second terminal serves the device, send the first message to the MME that serves the device.

In an optional design, the processor is configured to:

when sending, by using the first base station, the second message to the MME that serves the second terminal, send, to the first base station, an identifier of the MME that serves the second terminal, so that the first base station sends, according to the identifier of the MME that serves the second terminal, the second message to the MME that serves the second terminal; where the identifier of the MME that serves the second terminal is obtained by the device according to the identifier of the second terminal.

In an optional design, the second message is a tracking area update message, and an update type of the tracking area update message is path switching.

In an optional design, the processor is further configured to:

before sending the first message to the MME that serves the first terminal, camp on, according to a cell identifier of a cell in which the second terminal is located, the cell corresponding to the cell identifier.

In an optional design, the processor is configured to:

when receiving the configuration information obtained from the second base station by the MME that serves the first terminal, receive a third message sent by the MME that serves the first terminal, where the third message carries the configuration information; or receive the configuration information sent, by using the first base station, by the MME that serves the first terminal.

In an optional design, the identifier of the second terminal includes a GUTI of the second terminal, or an S-TMSI of the second terminal, or a temporary identifier allocated by the second base station to the second terminal.

In addition, an embodiment of the present invention further provides a communication path switching method, and a first terminal is in an idle state. The method includes: obtaining an identifier of a second terminal and an identifier of a cell in which the second terminal is located; when determining that the first terminal needs to establish a path for accessing a network by using the second terminal, sending, by the first terminal, an extended service request (Extended Service Request) message to an MME that serves the first terminal, where the message includes switch indication information and the identifier of the second terminal; after receiving the extended service request message, determining, according to the identifier of the second terminal by the MME that serves the first terminal, whether an MME that serves the second terminal is different from the MME that serves the first terminal; if the MME that serves the second terminal is different from the MME that serves the first terminal, sending, by the MME that serves the first terminal, a path switch request (Path Switch Request) message to the MME that serves the second terminal, where the message includes context information of the first terminal, and the message is used to request the MME that serves the second terminal to serve the first terminal; after the MME that serves the second terminal serves the first terminal, determining, according to the identifier of the second terminal by the MME that serves the first terminal, a second base station that serves the second terminal; sending a second message to the second base station, where the second message is used to notify the second base station that the first terminal requests to access the network by using the second terminal; receiving, by the MME that serves the first terminal, configuration information sent by the second base station, where the configuration information is used by the first terminal to access the network by using the second terminal; and sending, by the MME that serves the first terminal, the configuration information to the first terminal.

In the method provided in this embodiment of the present invention, in a plurality of complex scenarios, the first terminal can access the network more flexibly and reliably by using another terminal, thereby improving user experience and meeting a practical application requirement of a wearable device.

BRIEF DESCRIPTION OF DRAWINGS

FIG. 1 (b) is a schematic diagram of an underlying network infrastructure of an LTE system according to an embodiment of the present invention;

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The embodiments of the present invention provide a communication path switching method and apparatus, so as to implement communication path switching in a complex application scenario.

The method and the apparatus are based on a same inventive concept. Because problem resolving principles of the method and the apparatus are similar, mutual reference may be made to implementation of the method and the apparatus, and no repeated description is provided.

Figure 1:
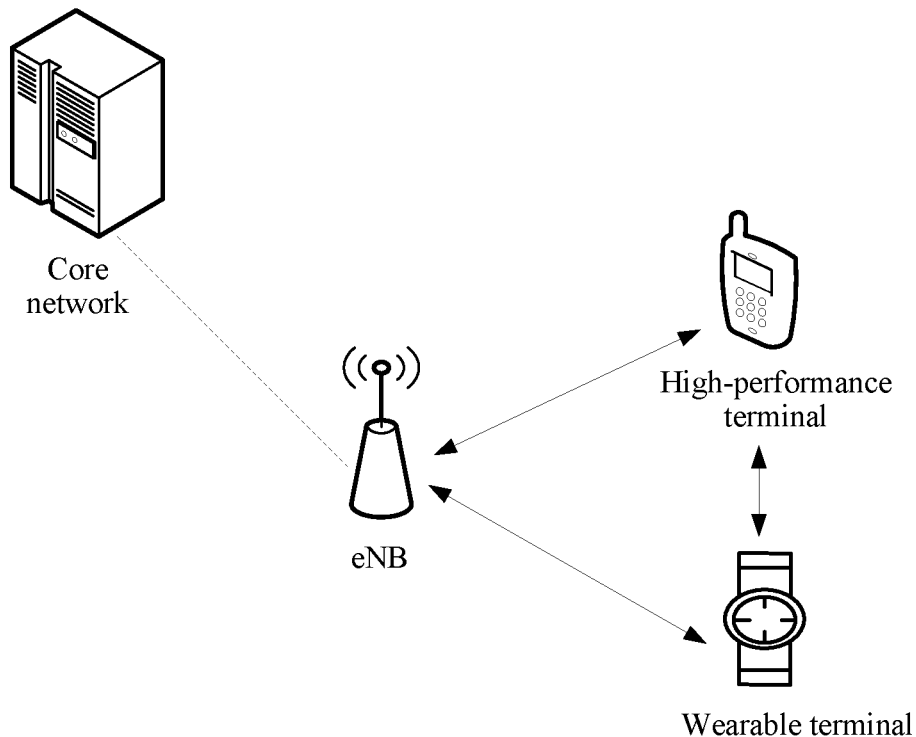
FIG. 1 (a) is a schematic diagram of accessing a network by a wearable terminal by using a high-performance terminal according to an embodiment of the present invention.
Figure 1:
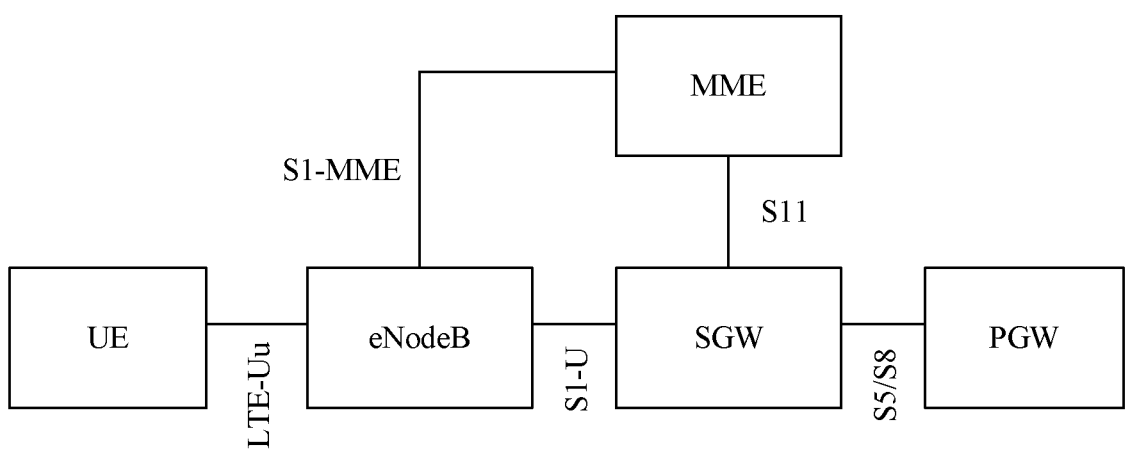

FIG. 1 (a) is a schematic diagram of accessing a network by a wearable terminal by using a high-performance terminal according to an embodiment of the present invention. FIG. 1 (a) is a main application scenario in the embodiments of the present invention. The wearable terminal independently accesses the network and directly communicates with a base station in the beginning. After performing communication path switching, the wearable terminal accesses the network by using a high-performance terminal. In this case, when the wearable terminal communicates with the network, the wearable terminal first sends data to the high-performance terminal, and then the high-performance terminal forwards the data to the base station.

Referring to FIG. 1 (b), FIG. 1 (b) shows an underlying network infrastructure of an LTE system, and the underlying network infrastructure includes various network elements and standardized interfaces. The network includes a core network and an access network. A network element in the access network is an eNodeB connected to a user terminal (UE), and network elements in the core network include a mobility management entity (Mobility Management Entity, MME), a serving gateway (Serving GateWay, SGW), a PDN gateway (PDN GateWay, PGW), and the like (some network elements in the core network are omitted and are not drawn herein). All the network elements are interconnected by using the interfaces.

The following describes preferred implementations of the present invention in detail with reference to the accompanying drawings.

Figure 2:
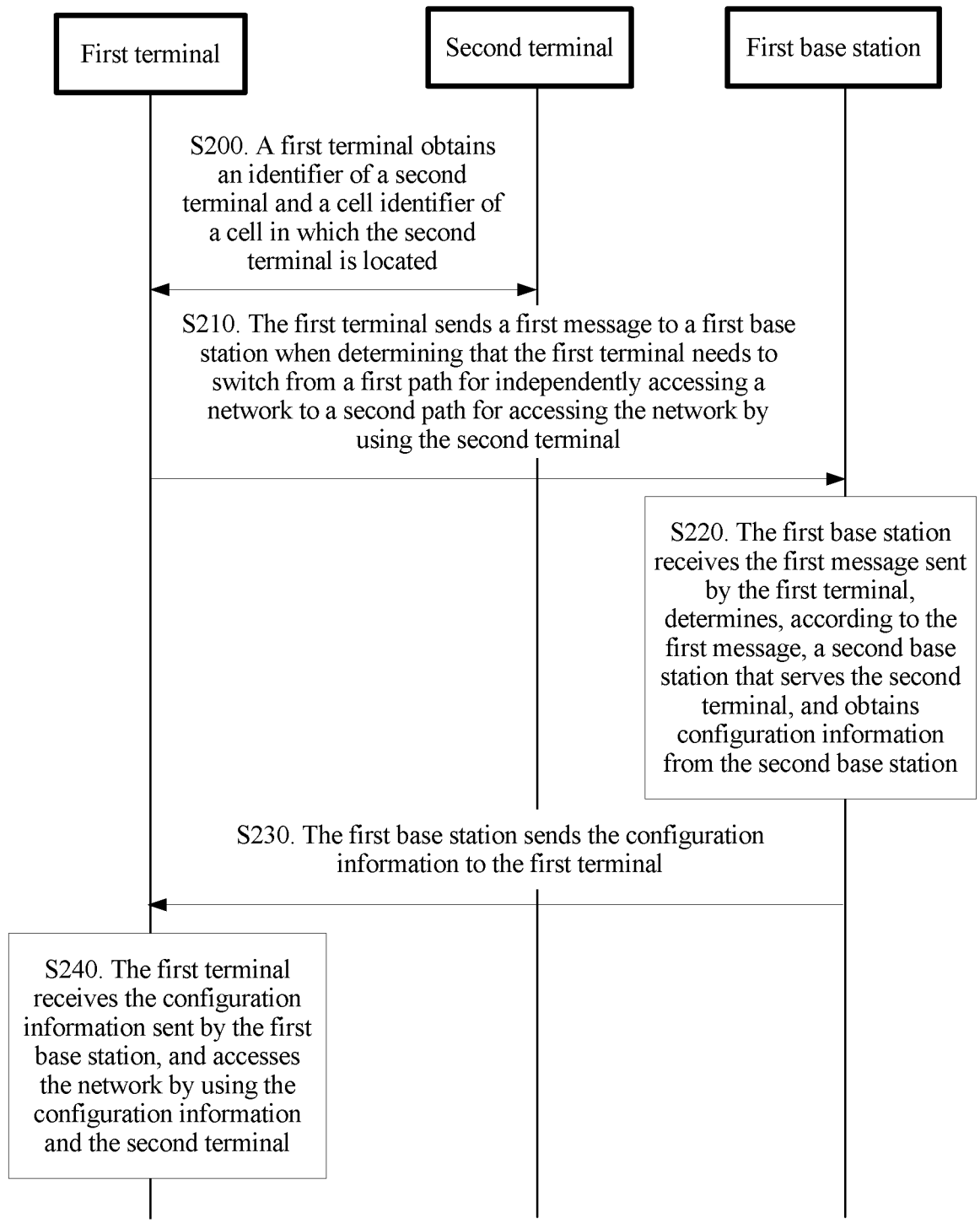
FIG. 2 is an overview flowchart 1 of a communication path switching method according to an embodiment of the present invention.

Referring to FIG. 2, an embodiment of the present invention provides a communication path switching method. The method includes the following steps.

A first terminal has independently accessed a network, completed an attach (attach) operation, and currently been in a connected (connected) state.

S200. The first terminal obtains an identifier of a second terminal and a cell identifier of a cell in which the second terminal is located.

The identifier of the second terminal includes a globally unique temporary identity (Globally Unique Temporary UE Identity, GUTI) of the second terminal, or an S-temporary mobile subscriber identity (S-Temporary Mobile Subscriber Identity, S-TMSI) of the second terminal, or a temporary identifier allocated by a second base station to the second terminal. For example, the temporary identifier allocated by the second base station to the second terminal is an eNB UE X2AP ID or a cell radio network temporary identifier (Cell Radio Network Temporary Identifier, C-RNTI).

S210. The first terminal sends a first message to a first base station when determining that the first terminal needs to switch from a first path for independently accessing the network to a second path for accessing the network by using the second terminal.

The first base station serves the first terminal. It should be learned that, different base stations on a control plane and a user plane may serve a same terminal whereas there is usually only one base station on the control plane.

The first message is used to request to switch the first terminal from the first path to the second path. The first message includes the identifier of the second terminal and the cell identifier of the cell in which the second terminal is located. The second terminal is a relay terminal used by the first terminal to access the network.

S220. The first base station receives the first message sent by the first terminal, determines, according to the first message, a second base station that serves the second terminal, and obtains configuration information from the second base station.

The configuration information is used by the first terminal to access the network by using the second terminal.

S230. The first base station sends the configuration information to the first terminal.

S240. The first terminal receives the configuration information sent by the first base station, and accesses the network by using the configuration information and the second terminal.

The configuration information includes radio resource information that is used by the first terminal to set up a radio bearer with the second terminal and that is allocated by the second base station. The first terminal sets up the radio bearer with the second terminal according to the radio resource information, and sends an acknowledgement message to the second base station by using the second terminal. The acknowledgement message is used to notify the second base station that the first terminal completes switching from the first path to the second path.

A manner in which the first base station obtains the configuration information from the second base station in S220 may include but is not limited to the following two manners.

Manner 1

Figure 3:
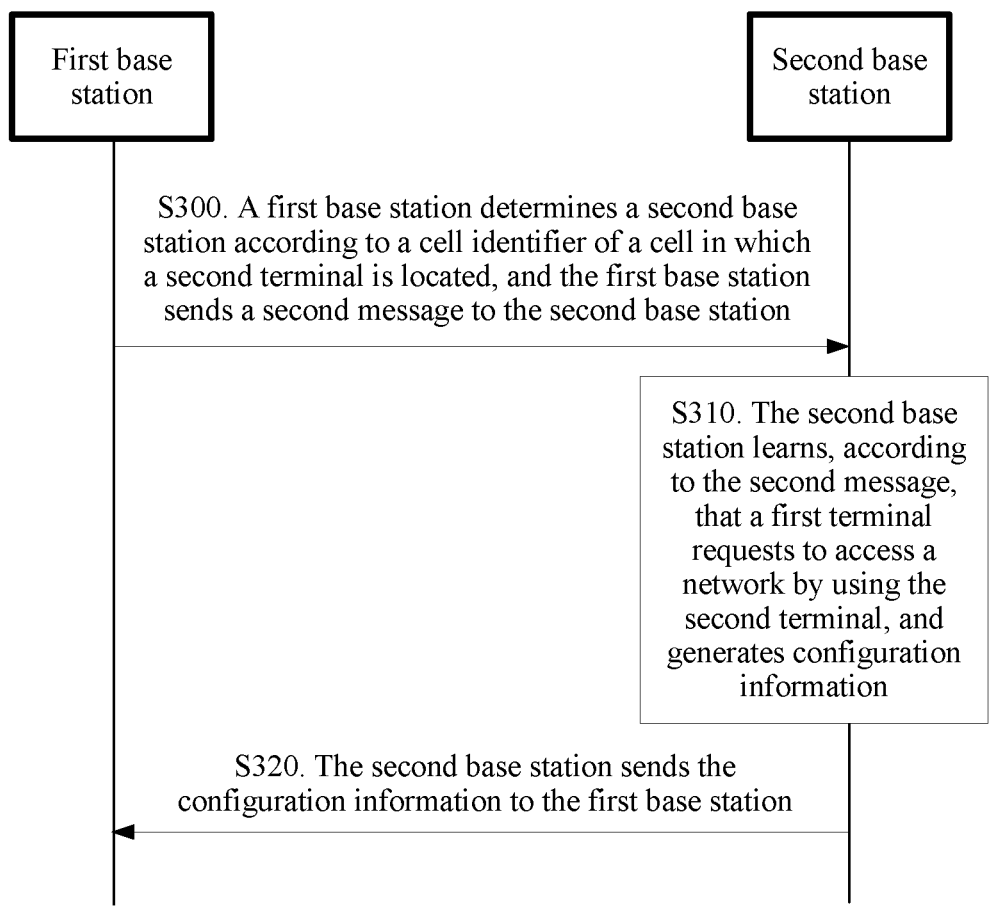
FIG. 3 is a specific flowchart of obtaining, by a first base station from a second base station in Manner 1, configuration information for accessing a network by a first terminal by using a second terminal according to an embodiment of the present invention.

Referring to FIG. 3, FIG. 3 shows a specific procedure of obtaining the configuration information by the first base station from the second base station in Manner 1.

S300. The first base station determines the second base station according to the cell identifier of the cell in which the second terminal is located, and the first base station sends a second message to the second base station.

The first base station and the second base station are different, and serve the first terminal and the second terminal respectively. The second message is used to notify the second base station that the first terminal requests to access the network by using the second terminal. Herein, the second message may also have another function, for example, may be used to request the second base station to serve the first terminal, and details are not described herein. The second message includes switch indication information and the identifier of the second terminal. The switch indication information is used to indicate that the first terminal requests to access the network by using another terminal.

S310. The second base station learns, according to the second message, that the first terminal requests to access the network by using the second terminal, and generates the configuration information.

In addition, after the second base station learns, according to the second message, that the first terminal requests to access the network by using the second terminal, and before the second base station generates the configuration information, the second base station sends, to an MME, a request for allowing the first terminal to access the network by using the second terminal, and receives an acknowledgement message that is for allowing the first terminal to access the network by using the second terminal and that is sent by the MME. Herein, the MME serves the first terminal and the second terminal.

S320. The second base station sends the configuration information to the first base station.

Manner 2

Figure 4A:
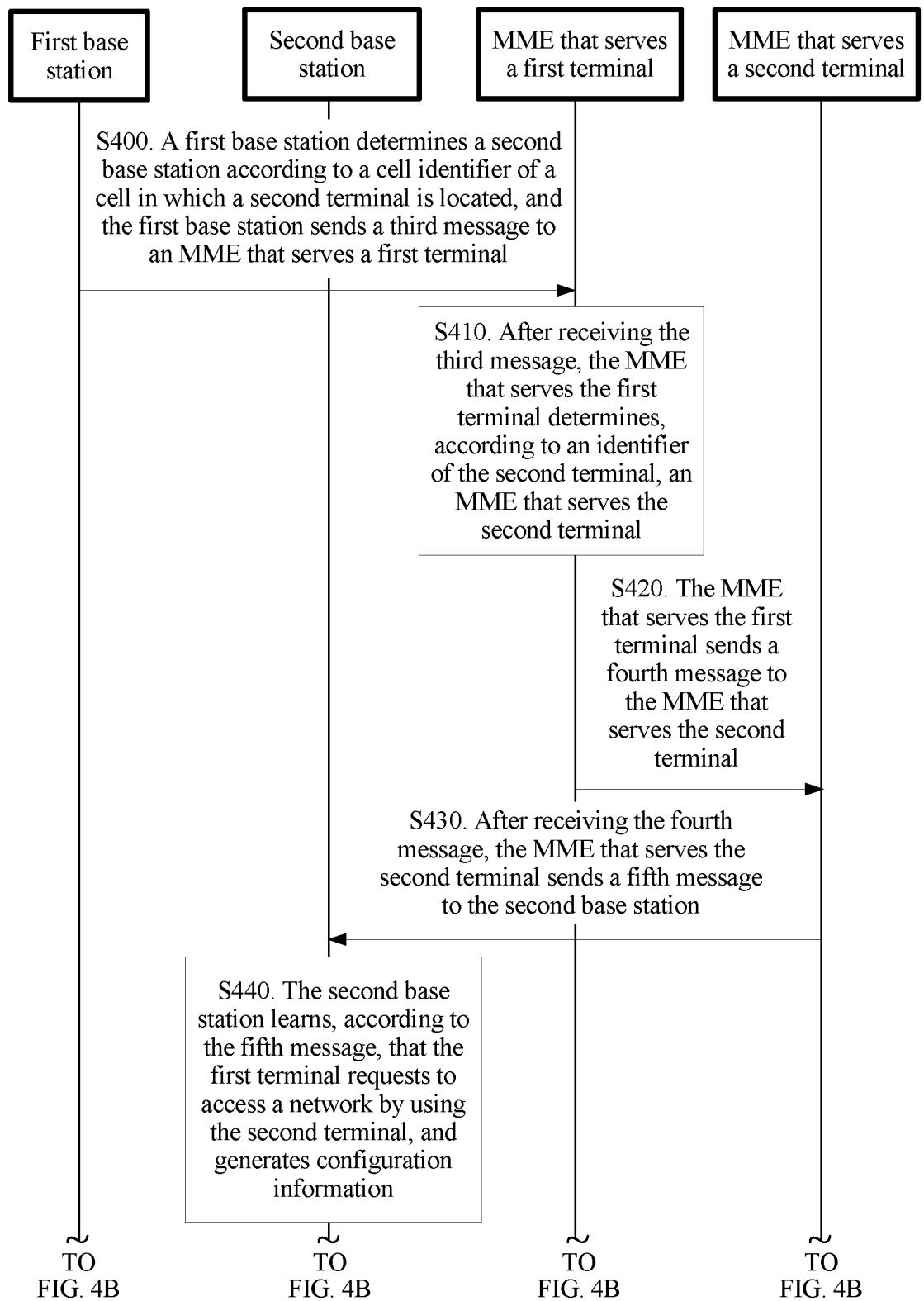
FIG. 4A and FIG. 4B are a specific flowchart of obtaining, by a first base station from a second base station in Manner 2, configuration information for accessing a network by a first terminal by using a second terminal according to an embodiment of the present invention.
Figure 4B:
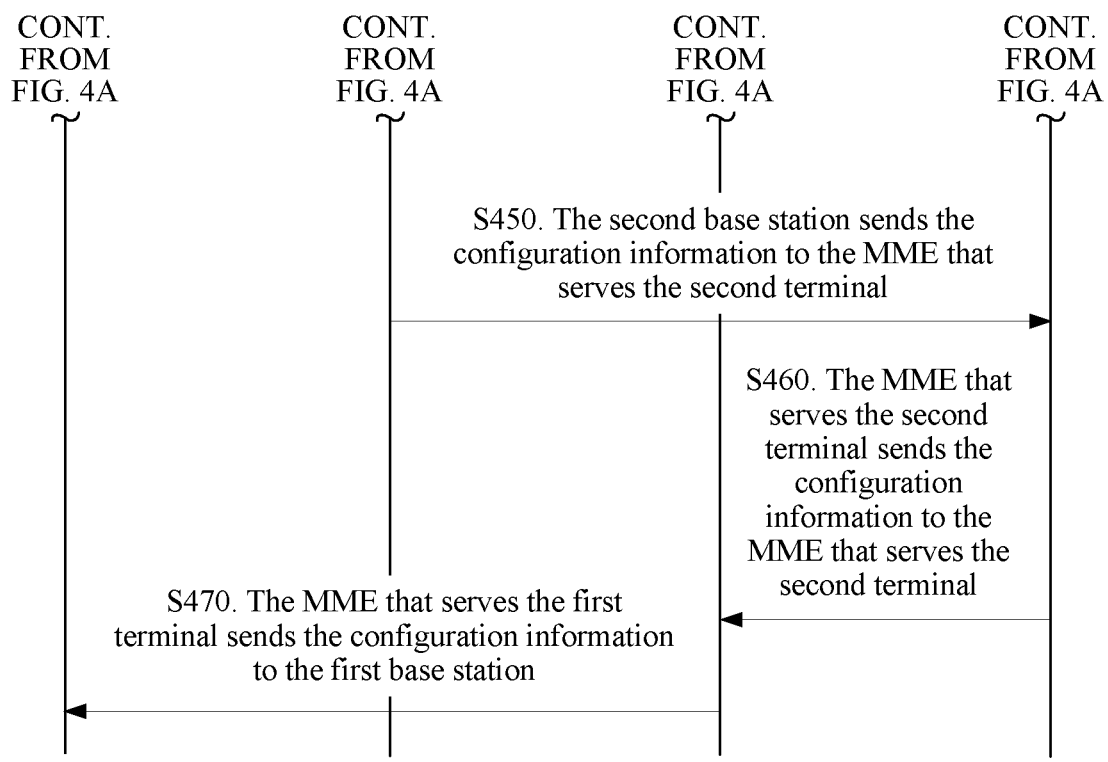

Referring to FIG. 4A and FIG. 4B, FIG. 4A and FIG. 4B show a specific procedure of obtaining the configuration information by the first base station from the second base station in Manner 2.

S400. The first base station determines the second base station according to the cell identifier of the cell in which the second terminal is located, and the first base station sends a third message to an MME that serves the first terminal.

The third message is used to notify the MME that the first terminal requests to access the network by using the second terminal, and is further used to request the MME that serves the first terminal to serve the first terminal. The third message includes switch indication information and the identifier of the second terminal.

It should be learned that, after the first base station determines the second base station according to the cell identifier of the cell in which the second terminal is located, if it is determined that the MME serving the first terminal is the same as an MME serving the second terminal, the configuration information that is used by the first terminal to access the network by using the second terminal may be obtained in Manner 1 or Manner 2; or if it is determined that the MME serving the first terminal is different from an MME serving the second terminal, or the configuration information that is used by the first terminal to access the network by using the second terminal fails to be obtained in Manner 1, or if the first base station and the second base station cannot directly communicate with each other, for example, there is no interface between the two base stations, the configuration information that is used by the first terminal to access the network by using the second terminal is obtained in Manner 2.

S410. After receiving the third message, the MME that serves the first terminal determines, according to the identifier of the second terminal, an MME that serves the second terminal.

S420. The MME that serves the first terminal sends a fourth message to the MME that serves the second terminal.

The fourth message includes the switch indication information and the identifier of the second terminal.

S430. After receiving the fourth message, the MME that serves the second terminal sends a fifth message to the second base station.

The fifth message includes the switch indication information and the identifier of the second terminal.

S440. The second base station learns, according to the fifth message, that the first terminal requests to access the network by using the second terminal, and generates the configuration information.

Likewise, after the second base station learns, according to the fifth message, that the first terminal requests to access the network by using the second terminal, and before the second base station generates the configuration information, the second base station sends, to the MME that serves the second terminal, a request for allowing the first terminal to access the network by using the second terminal, and receives an acknowledgement message that is for allowing the first terminal to access the network by using the second terminal and that is sent by the MME that serves the second terminal.

S450. The second base station sends the configuration information to the MME that serves the second terminal.

S460. The MME that serves the second terminal sends the configuration information to the MME that serves the second terminal.

S470. The MME that serves the first terminal sends the configuration information to the first base station.

With reference to specific application scenarios, the following further describes the embodiment described in FIG. 2 to FIG. 4A and FIG. 4B.

Scenario 1

Figure 5A:
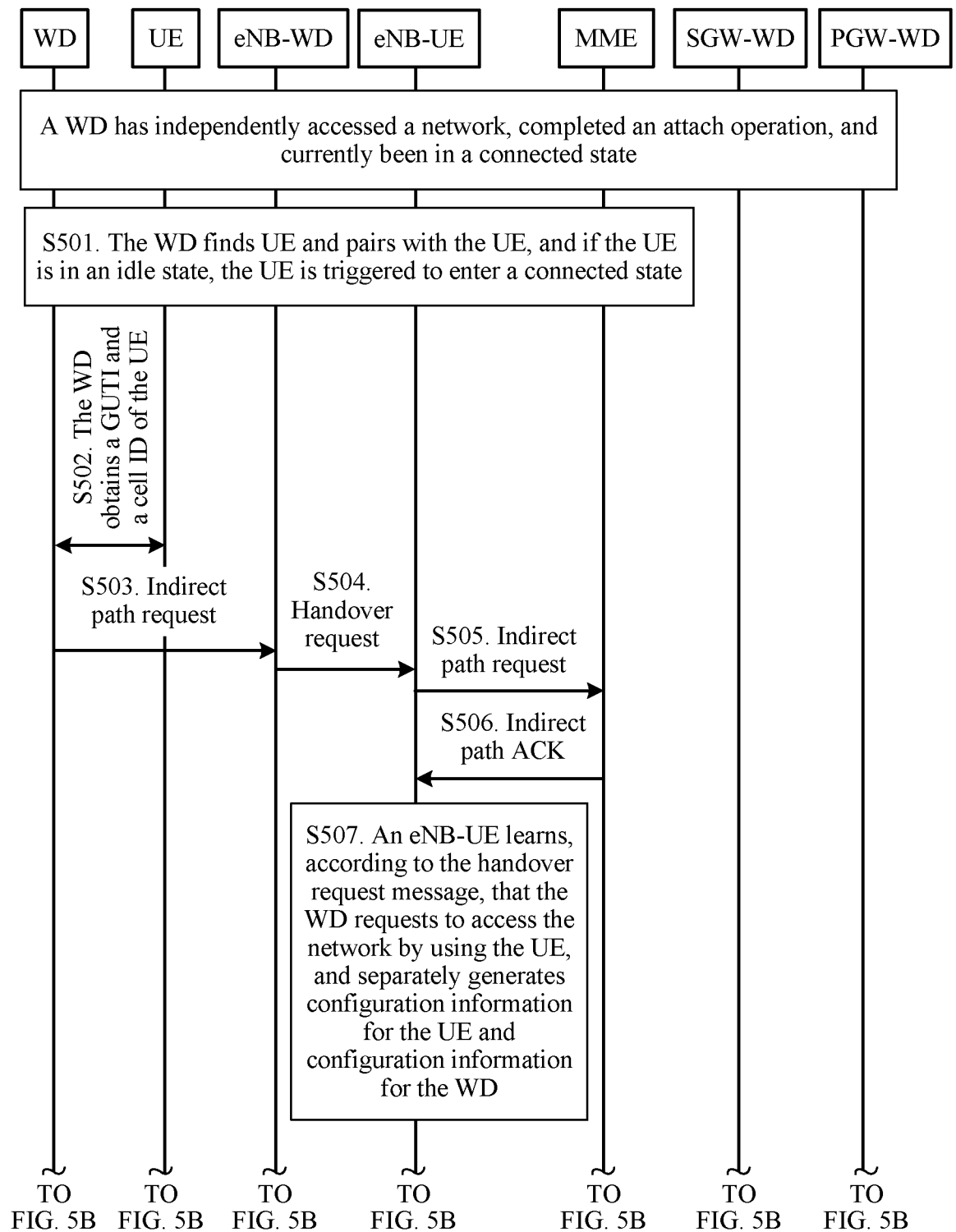
FIG. 5A, FIG. 5B, and FIG. 5C are a specific flowchart 1 of switching a WD in a connected state from a direct path for independently accessing a network to an indirect path for accessing the network by using UE according to an embodiment of the present invention.
Figure 5B:
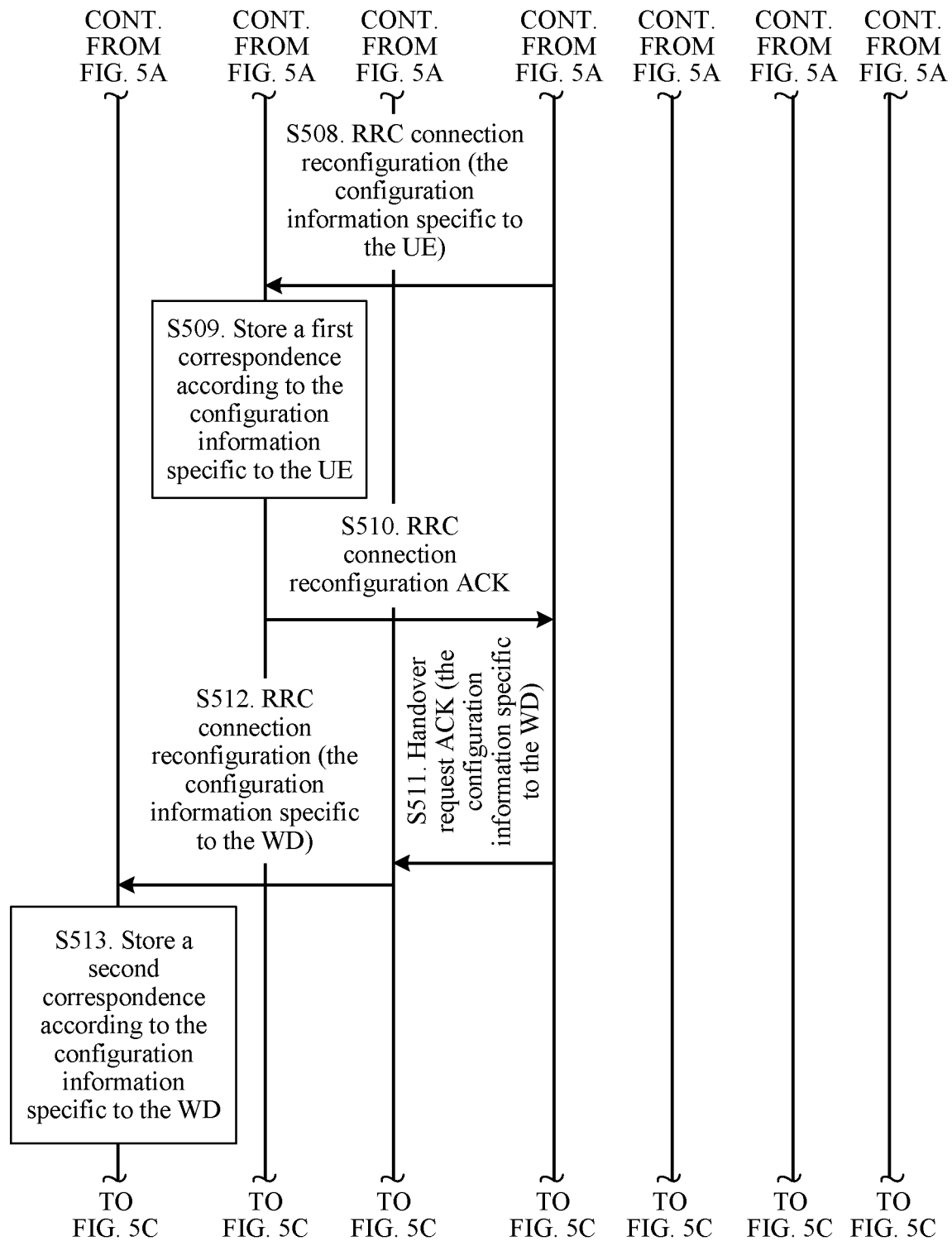
Figure 5C:
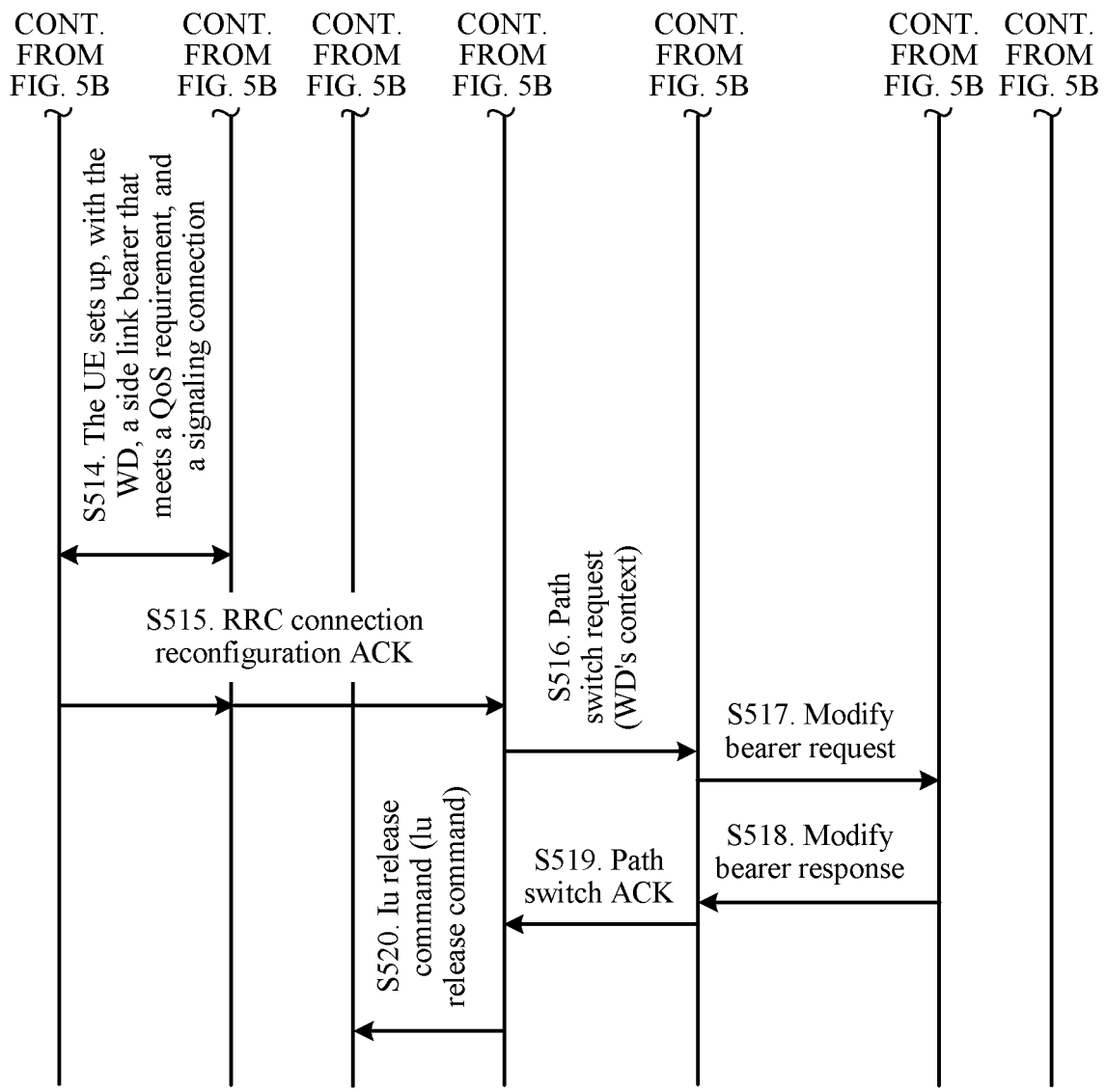

Referring to FIG. 5A, FIG. 5B, and FIG. 5C, it is assumed that the first terminal is a WD, the second terminal is user equipment (User Equipment, UE), eNBs on which the WD and the UE camp are different and are respectively an eNB-WD and an eNB-UE, and a same MME serves the WD and the UE. A specific process in which the WD switches, in a connected state, from a first path for independently accessing the network, that is, a direct path (direct path), to a second path for accessing the network by using the UE, that is, an indirect path (indirect path) is as follows:

Before the WD performs communication path switching, the WD has independently accessed the network, completed an attach operation, and currently been in the connected state.

S501. The WD finds the UE and pairs with the UE.

If the UE is in an idle state, the UE is triggered to enter a connected state.

S502. The WD obtains a GUTI and a cell ID of the UE.

Herein, the GUTI of the UE is used only as an example, and another identifier of the UE may be used.

S503. The WD sends an indirect path request (indirect path request) message to the eNB-WD when the WD determines that the WD needs to switch from the direct path to the indirect path.

The indirect path request message is used to request to switch the WD from the direct path to the indirect path, and the message includes the GUTI and the cell ID of the UE.

S504. After receiving the indirect path request message, the eNB-WD determines, according to the cell ID of the UE, that the eNBs of the UE and the WD are different, and sends a handover request (handover request) message to the eNB-UE.

In this embodiment of the present invention, the handover request message is used to notify the eNB-UE that the WD requests to access the network by using the UE. In addition, the handover request message may be further used to request the eNB-UE to serve the WD. Herein, the handover request message includes the GUTI of the UE, an ID of the WD, and information indicating that the WD is to witch from the direct path to the indirect path, that is, a relay indication (relay indication).

S505. After receiving the handover request message sent by the eNB-WD, the eNB-UE sends an indirect path request to the MME, to request the MME to allow the WD to access the network by using the UE, where the message includes an ID of the WD and the GUTI of the UE.

S506. The MME returns an indirect path ACK message to the eNB-UE, where the message is used to notify the eNB-UE that the MME allows the WD to access the network by using the UE.

S505 and S506 are optional steps. After the eNB-UE receives the handover request message sent by the eNB-WD, the two steps may not be performed, and S507 is directly performed.

S507. The eNB-UE learns, according to the handover request message, that the WD requests to access the network by using the UE, and separately generates configuration information for the UE and configuration information for the WD.

Specifically, the eNB-UE allocates a corresponding L2 ID to the WD, and allocates a corresponding side link identifier (Side link ID, SLI) to an EPS bearer identity (EPS bearer ID, EBI) of the WD, according to a context of the WD.

Context information of the WD includes security-related information, bearer-related information, location-related information, and the like of the UE.

The L2 ID is used to make the UE and the eNB-UE identify that data transmitted by using a data radio bearer (Data Radio Bearer, DRB) of the UE belongs to the WD, and the SLI is used to identify a side link between the WD and the UE.

The configuration information specific to the UE includes a first correspondence: a correspondence between the SLI and each of an RB-ID and the L2 ID of the UE. A meaning of the correspondence is as follows: If the UE receives data from the side link identified by the SLI of the WD, the UE sends the data to the eNB-UE by using the DRB that is identified by the RB-ID of the UE, and notifies, by using the L2 ID, the eNB-UE that the sent data belongs to the WD. Herein, the DRB is a radio bearer for data transmission between the UE and the eNB-UE.

The configuration information specific to the WD includes a second correspondence: a correspondence between the EBI and the SLI. A meaning of the correspondence is as follows: When determining that the WD needs to use a bearer corresponding to the EBI to send data, the WD sends the data to the UE by using the side link identified by the SLI.

The configuration information specific to the WD further includes a list of a correspondence between the EBI and each of the SLI of the WD and a PC5 radio resource (radio resource). Herein, the PC5 radio resource is a radio resource used for a side link bearer that is between the WD and the UE and that is corresponding to the SLI. An interface between the WD and the UE is a PC5 interface.

S508. The eNB-UE sends an RRC connection reconfiguration (RRC connection Reconfiguration) message to the UE.

The RRC connection reconfiguration message carries the configuration information specific to the UE.

S509. After receiving the RRC connection reconfiguration message, the UE stores a first correspondence according to the configuration information specific to the UE.

S510. The UE returns an RRC connection reconfiguration acknowledgement (RRC connection Reconfiguration ACK) message to the eNB-UE.

S511. The eNB-UE sends a handover request ACK message to the eNB-WD.

The handover request ACK message carries the configuration information specific to the WD. The configuration information specific to the WD may be sent by using a container (container).

S512. The eNB-WD sends an RRC connection reconfiguration message to the WD.

The RRC connection reconfiguration message carries the configuration information specific to the WD.

S513. After receiving the RRC connection reconfiguration message, the WD stores a second correspondence according to the configuration information specific to the WD.

S514. The UE sets up, with the WD according to a PC5 radio resource, a side link bearer (Side link bearer) that meets a QoS requirement, and a signaling connection.

S515. The WD sends an RRC connection reconfiguration ACK message to the eNB-UE by using the UE.

The message is used to notify the eNB-UE that the WD completes switching from the direct path to the indirect path.

S516. The eNB-UE sends a path switch request (Path Switch Request) message to the MME.

S517. The MME sends a modify bearer request (Modify Bearer Request) message to an SGW.

The message is used to set up, for the WD, a connection between the eNB-UE and the SGW.

S518. The MME returns a modify bearer response (Modify Bearer Response) message to the eNB-UE.

The message is used to notify the MME that the connection between the eNB-UE and the SGW is successfully set up for the WD.

S519. The MME sends a path switch acknowledgement (Path Switch Ack) message to the eNB-UE.

S520. The eNB-UE sends a Iu release command (Iu release Command) to the eNB-WD.

The message is used to notify the eNB-WD to release a connection between the eNB-WD and the WD.

Scenario 2

Figure 6A:
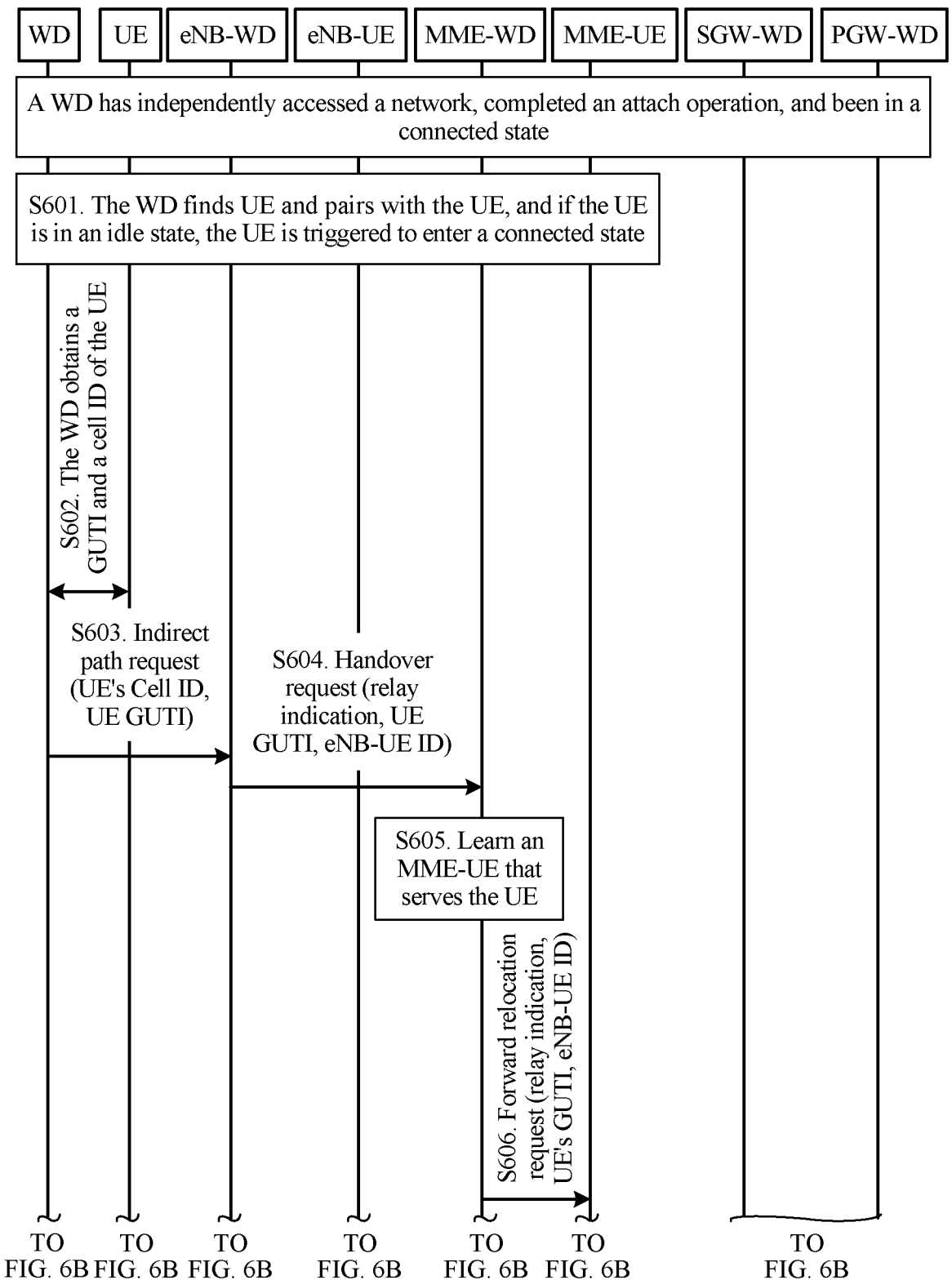
FIG. 6A, FIG. 6B, and FIG. 6C are a specific flowchart 2 of switching a WD in a connected state from a direct path for independently accessing a network to an indirect path for accessing the network by using UE according to an embodiment of the present invention.
Figure 6B:
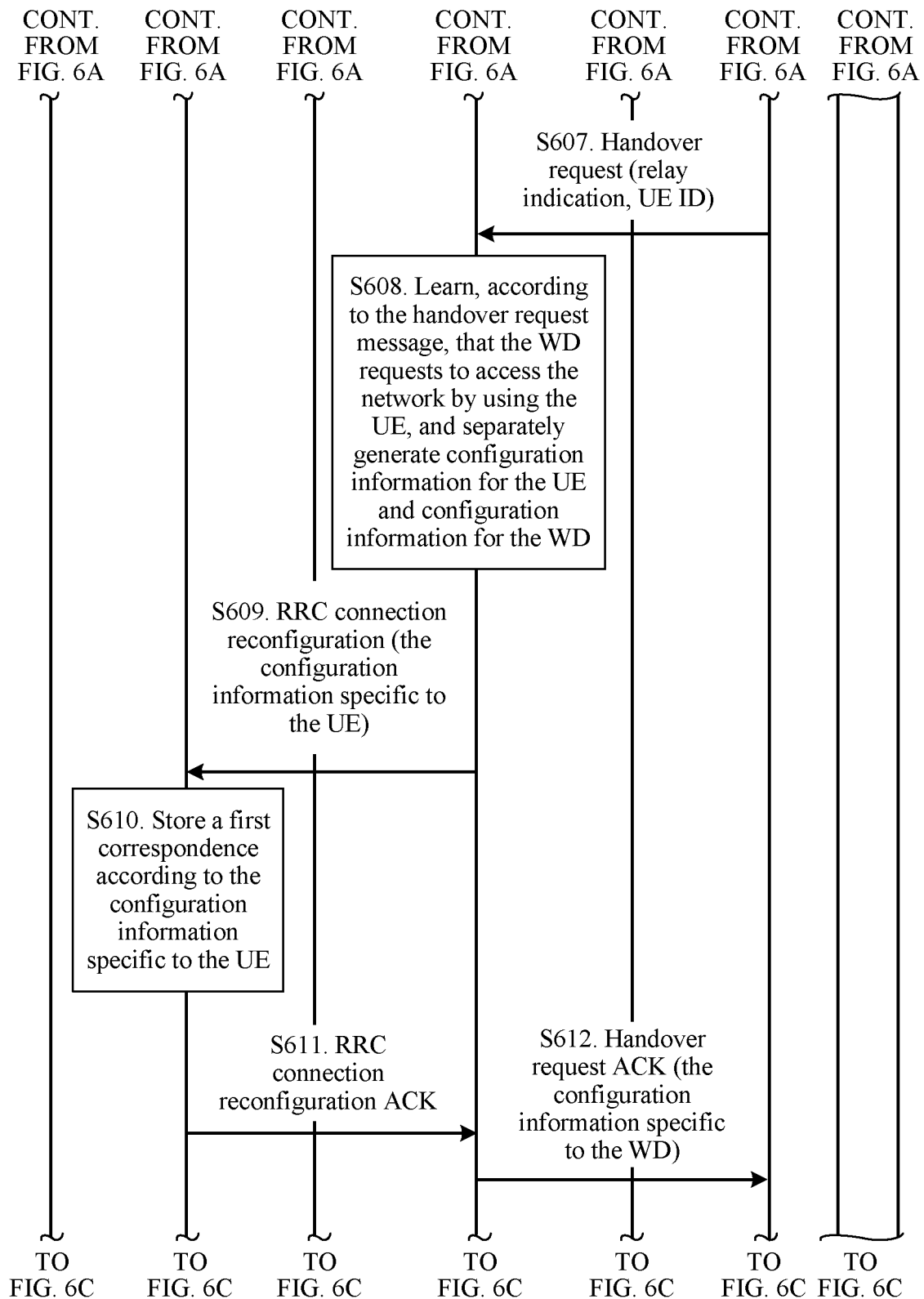
Figure 6C:
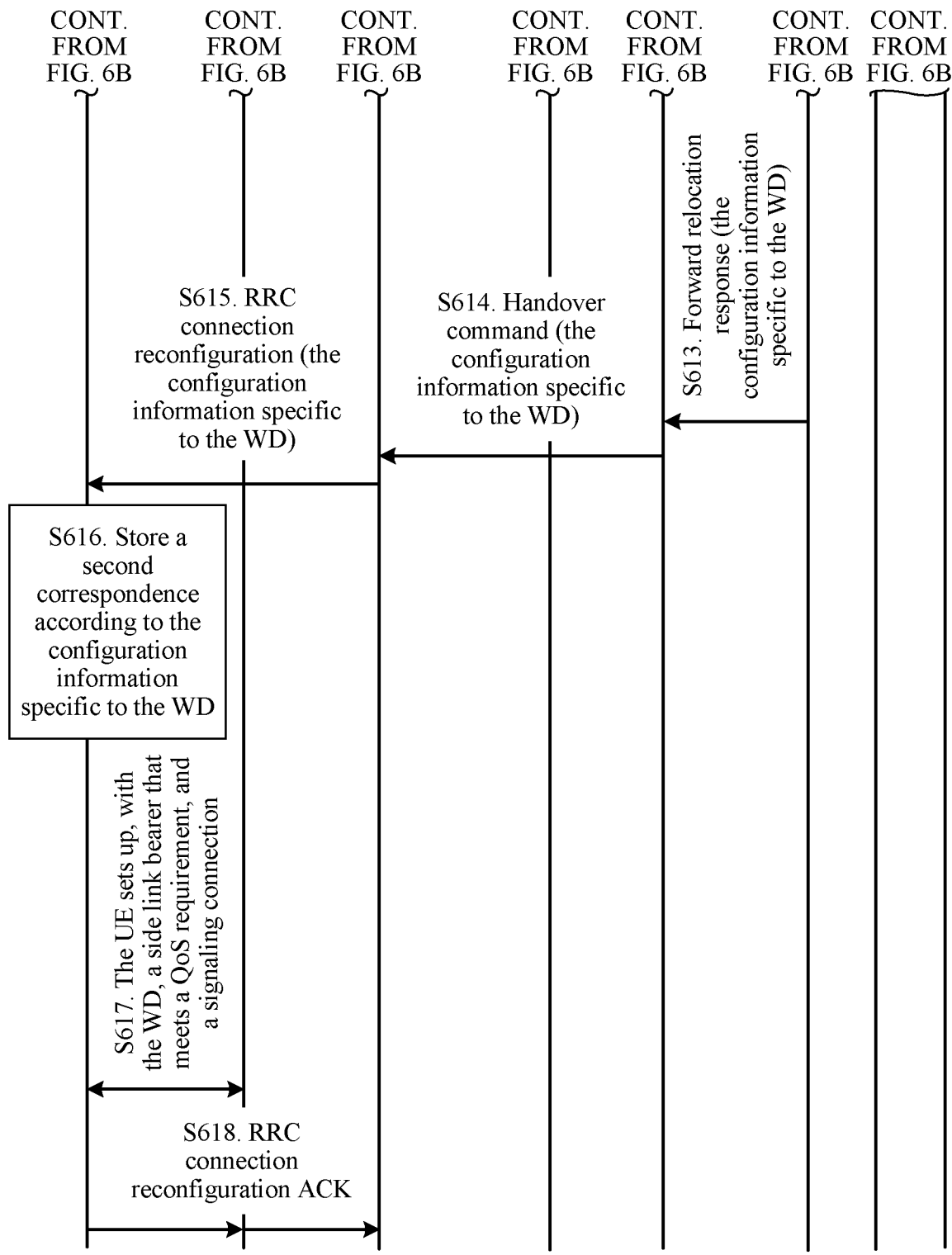

Referring to FIG. 6A, FIG. 6B, and FIG. 6C, it is assumed that the first terminal is a WD, the second terminal is UE, eNBs on which the WD and the UE camp are different and are respectively an eNB-WD and an eNB-UE, and different MMEs serve the WD and the UE and are respectively an MME-WD and an MME-UE. A specific process in which the WD switches, in a connected state, from a direct path for independently accessing the network to an indirect path for accessing the network by using the UE is as follows:

Before the WD performs communication path switching, the WD has independently accessed the network, completed an attach operation, and currently been in the connected state.

S601. The WD finds the UE and pairs with the UE.

If the UE is in an idle state, the UE is triggered to enter a connected state.

S602. The WD obtains a GUTI and a cell ID of the UE.

Like the embodiment shown in FIG. 3, herein the GUTI of the UE is used only as an example, and another identifier of the UE may alternatively be used.

S603. The WD sends an indirect path request (indirect path request) message to the eNB-WD when the WD determines that the WD needs to switch from the direct path to the indirect path.

The indirect path request message is used to request to switch the WD from the direct path to the indirect path, and the message includes the GUTI and the cell ID of the UE.

S604. After receiving the indirect path request message, the eNB-WD determines, according to the cell ID of the UE, that the eNBs of the UE and the WD are different, determines, according to the GUTI of the UE, that different MMEs serve the UE and the WD, and sends a handover request message to the MME-WD.

The message includes a relay indication, the GUTI of the UE, and an eNB ID currently used by the UE.

It should be learned that, in the embodiment shown in FIG. 6A, FIG. 6B, and FIG. 6C, sending the handover request message by the eNB-WD to the MME-WD when the eNB-WD determines that different MMEs serve the UE and the WD is only one case in which implementation communication path switching is completed by using the MME. In addition, even if a same MME serves the UE and the WD, when communication path switching fails in the method provided in the embodiment in FIG. 5A, FIG. 5B, and FIG. 5C, the communication path switching may be completed by using the MME. Alternatively, if there is no interface between two base stations and the two base stations cannot directly communicate with each other, communication path switching also needs to be completed by using the MME. Therefore, the embodiment shown in FIG. 5A, FIG. 5B, and FIG. 5C is only one scenario in which the communication path switching is completed by using the MME, and other possible scenarios are not all listed. However, principles of communication path switching are the same, and details are not described herein.

S605. After receiving the handover request message, the MME-WD learns, according to the GUTI of the UE, the MME-UE that serves the UE.

S606. The MME-WD sends a forward relocation request (Forward Relocation Request) message to the MME-UE.

The message carries the relay indication, the GUTI of the UE, and the eNB ID currently used by the UE.

S607. After receiving the forward relocation request message, the MME-UE sends a handover request message to the eNB-UE.

The message carries the relay indication and an ID of the UE.

S608. The eNB-UE learns, according to the handover request message, that the WD requests to access the network by using the UE, and separately generates configuration information for the UE and configuration information for the WD.

S609. The eNB-UE sends an RRC connection reconfiguration (RRC connection Reconfiguration) message to the UE.

The RRC connection reconfiguration message carries the configuration information specific to the UE.

S610. After receiving the RRC connection reconfiguration message, the UE stores a first correspondence according to the configuration information specific to the UE.

S611. The UE returns an RRC connection reconfiguration acknowledgement (RRC connection Reconfiguration ACK) message to the eNB-UE.

S612. The eNB-UE sends a handover request ACK message to the MME-UE.

The message carries the configuration information specific to the WD.

S613. The MME-UE sends a forward relocation response (Forward Relocation Response) message to the MME-WD.

The message carries the configuration information specific to the WD.

S614. The MME-WD sends a handover command (handover Command) to the eNB-WD.

The message carries the configuration information specific to the WD.

S615. The eNB-WD sends an RRC connection reconfiguration message to the WD.

The RRC connection reconfiguration message carries the configuration information specific to the WD.

S616. After receiving the RRC connection reconfiguration message, the WD stores a second correspondence according to the configuration information specific to the WD.

S617. The UE sets up, with the WD, a side link bearer (Side link bearer) that meets a QoS requirement, and a signaling connection.

S618. The WD sends an RRC connection reconfiguration ACK message to the eNB-UE by using the UE.

The message is used to notify the eNB-UE that the WD completes switching from the direct path to the indirect path.

In addition, the embodiment shown in FIG. 6A, FIG. 6B, and FIG. 6C also includes S516 to S520 in the embodiment shown in FIG. 5A, FIG. 5B, and FIG. 5C, and S516 to S520 are mainly a processing procedure in the prior art, and therefore, are omitted and are not drawn.

Figure 7A:
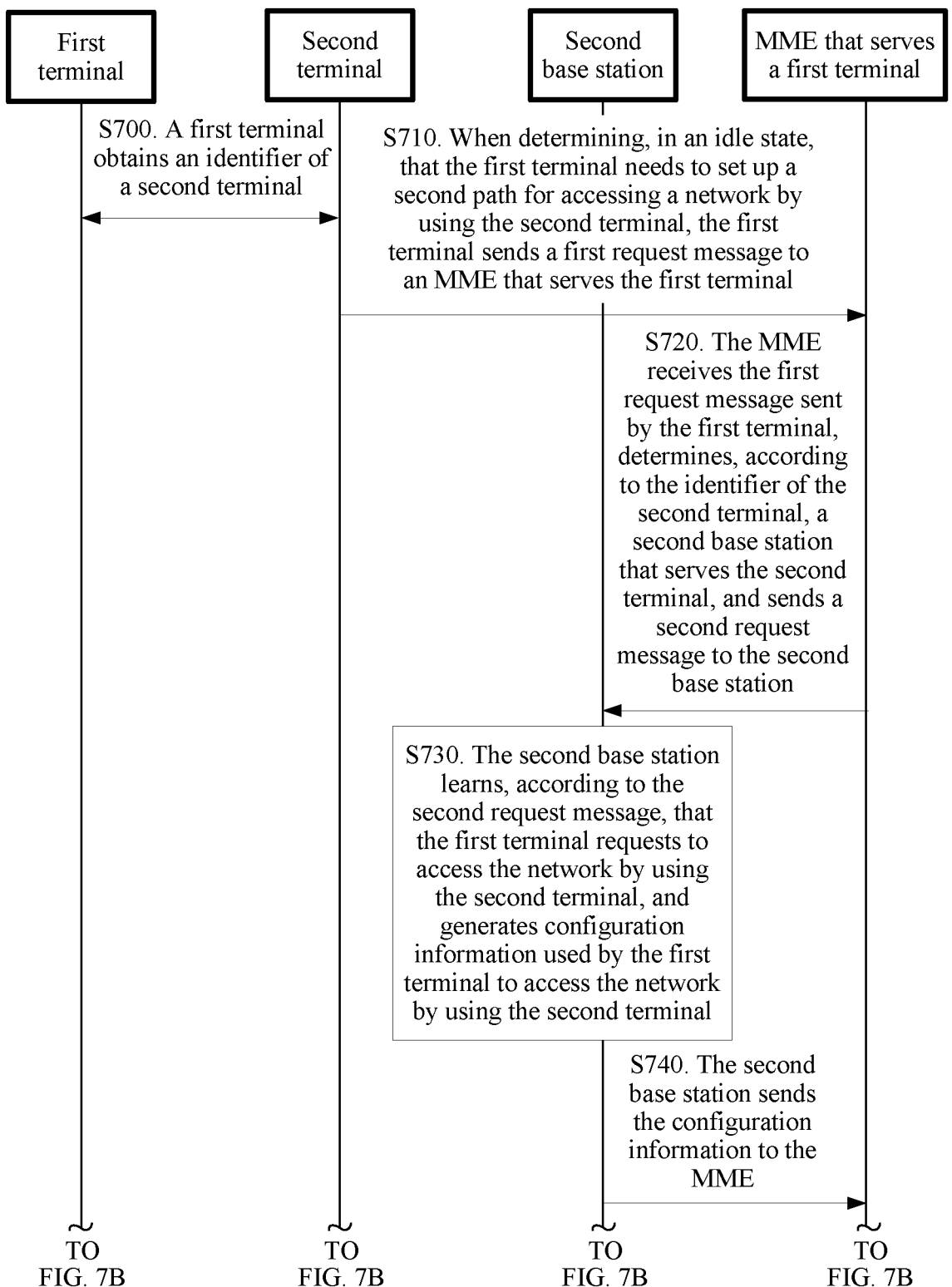
FIG. 7A and FIG. 7B are an overview flowchart 2 of a communication path switching method according to an embodiment of the present invention.
Figure 7B:
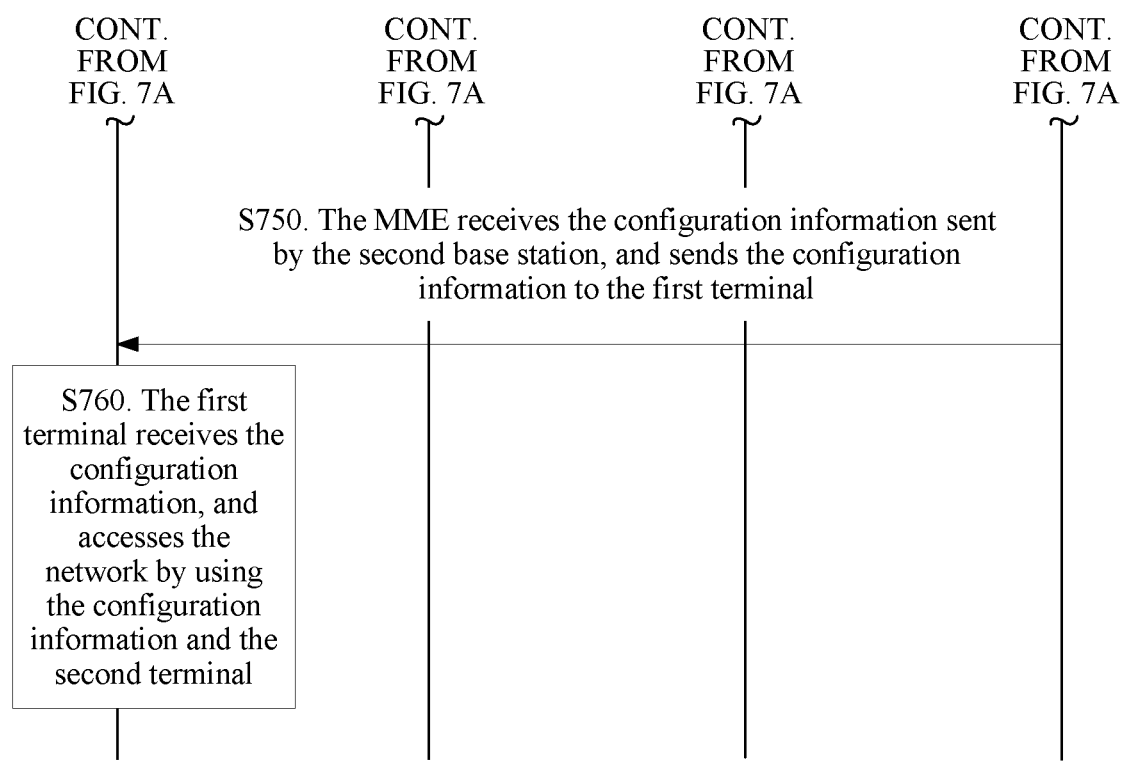

Referring to FIG. 7A and FIG. 7B, an embodiment of the present invention provides a communication path switching method. The method includes the following steps.

A first terminal has independently accessed a network, completed an attach operation, and currently been in an idle state.

S700. The first terminal obtains an identifier of a second terminal.

S710. When determining, in the idle state, that the first terminal needs to set up a second path for accessing the network by using the second terminal, the first terminal sends a first request message to an MME that serves the first terminal.

The first request message includes switch indication information and the identifier of the second terminal, and the switch indication information is used to indicate that the first terminal requests to access the network by using another terminal.

S720. The MME receives the first request message sent by the first terminal, determines, according to the identifier of the second terminal, a second base station that serves the second terminal, and sends a second request message to the second base station.

The second request message is used to notify the second base station that the first terminal requests to access the network by using the second terminal.

In addition, before the MME sends the second request message to the second base station, the MME queries whether there is a pairing relationship between the second terminal and the first terminal, and if there is a pairing relationship between the second terminal and the first terminal, the MME allows the first terminal to access the network by using the second terminal.

S730. The second base station learns, according to the second request message, that the first terminal requests to access the network by using the second terminal, and generates configuration information.

The configuration information is used by the first terminal to access the network by using the second terminal.

S740. The second base station sends the configuration information to the MME.

S750. The MME receives the configuration information sent by the second base station, and sends the configuration information to the first terminal.

A manner in which the MME sends the configuration information to the first terminal may include but is not limited to the following two manners:

Manner 1: The MME sends a first acknowledgement message to the first terminal, where the first acknowledgement message carries the configuration information.

Manner 2: The MME sends the configuration information to the first terminal by using a first base station.

S760. The first terminal receives the configuration information, and accesses the network by using the configuration information and the second terminal.

In S710, that the first terminal sends the first request message to the MME that serves the first terminal may include the following two cases:

Case 1: When determining, according to the identifier of the second terminal, that an MME that serves the second terminal is the same as the MME that serves the first terminal, the first terminal directly sends the first request message to the MME that serves the first terminal.

Case 2: When determining, according to the identifier of the second terminal, that an MME that serves the second terminal is different from the MME that serves the first terminal, the first terminal sends, by using the first base station, a third request message to the MME that serves the second terminal, where the third request message is used to request the MME that serves the second terminal to serve the first terminal. After determining that the MME that serves the second terminal serves the first terminal, the first terminal sends the first request message to the MME that serves the first terminal.

Specifically, when the first terminal sends, by using the first base station, the third request message to the MME that serves the second terminal, the first terminal sends, to the first base station, an identifier of the MME that serves the second terminal, so that the first base station sends, according to the identifier of the MME that serves the second terminal, the third request message to the MME that serves the second terminal. The identifier of the MME that serves the second terminal is obtained by the first terminal according to the identifier of the second terminal. The third request message is a tracking area update message, and an update type of the tracking area update message is path switching.

In addition, before S710 is performed, the first terminal may camp on, according to a cell identifier of a cell in which the second terminal is located, the cell corresponding to the cell identifier.

With reference to specific application scenarios, the following further describes the embodiment described in FIG. 7A and FIG. 7B.

Scenario 3

Figure 8A:
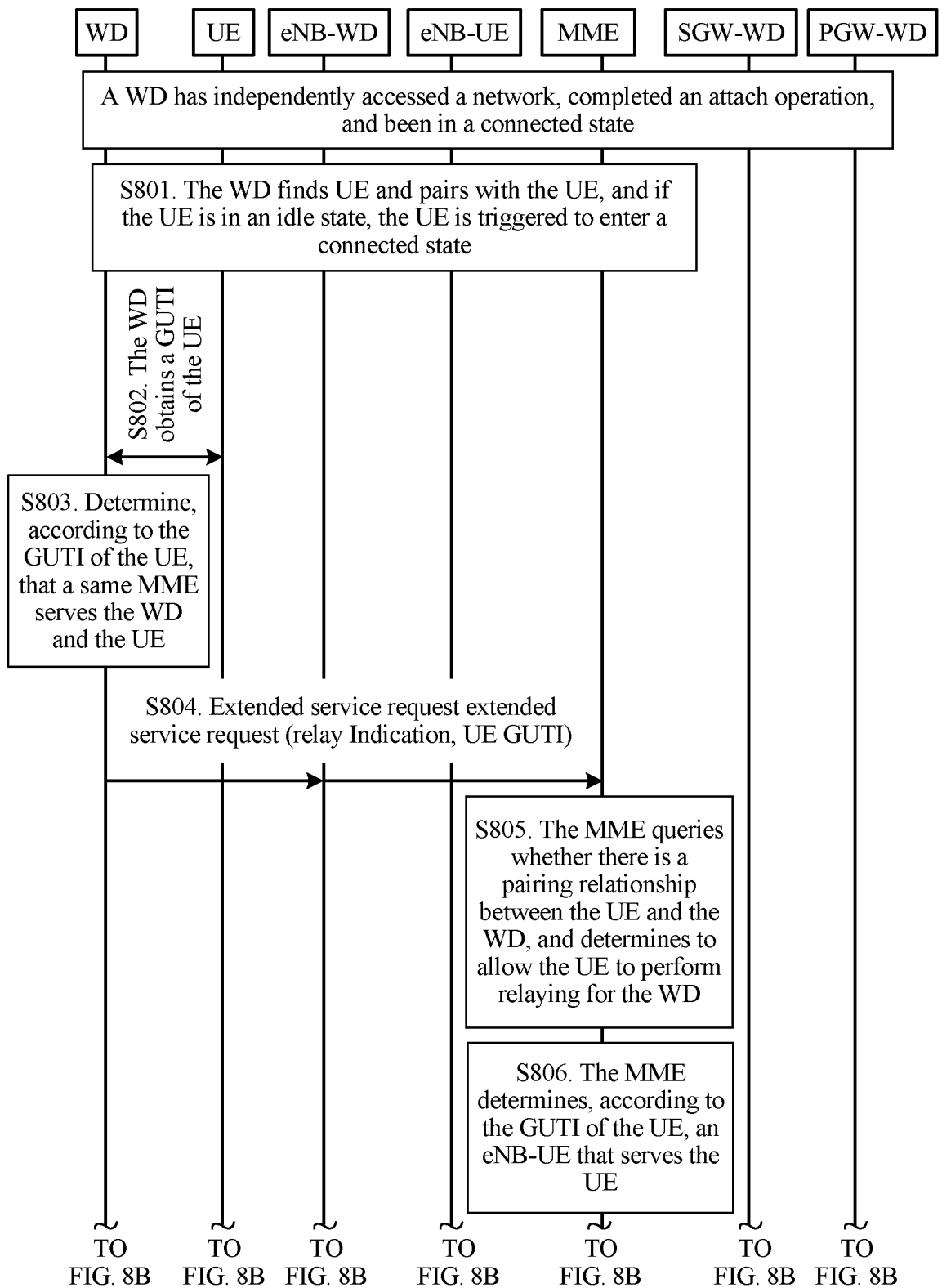
FIG. 8A, FIG. 8B, and FIG. 8C are a specific flowchart 1 of switching a WD in an idle state from a direct path for independently accessing a network to an indirect path for accessing the network by using UE according to an embodiment of the present invention.
Figure 8B:
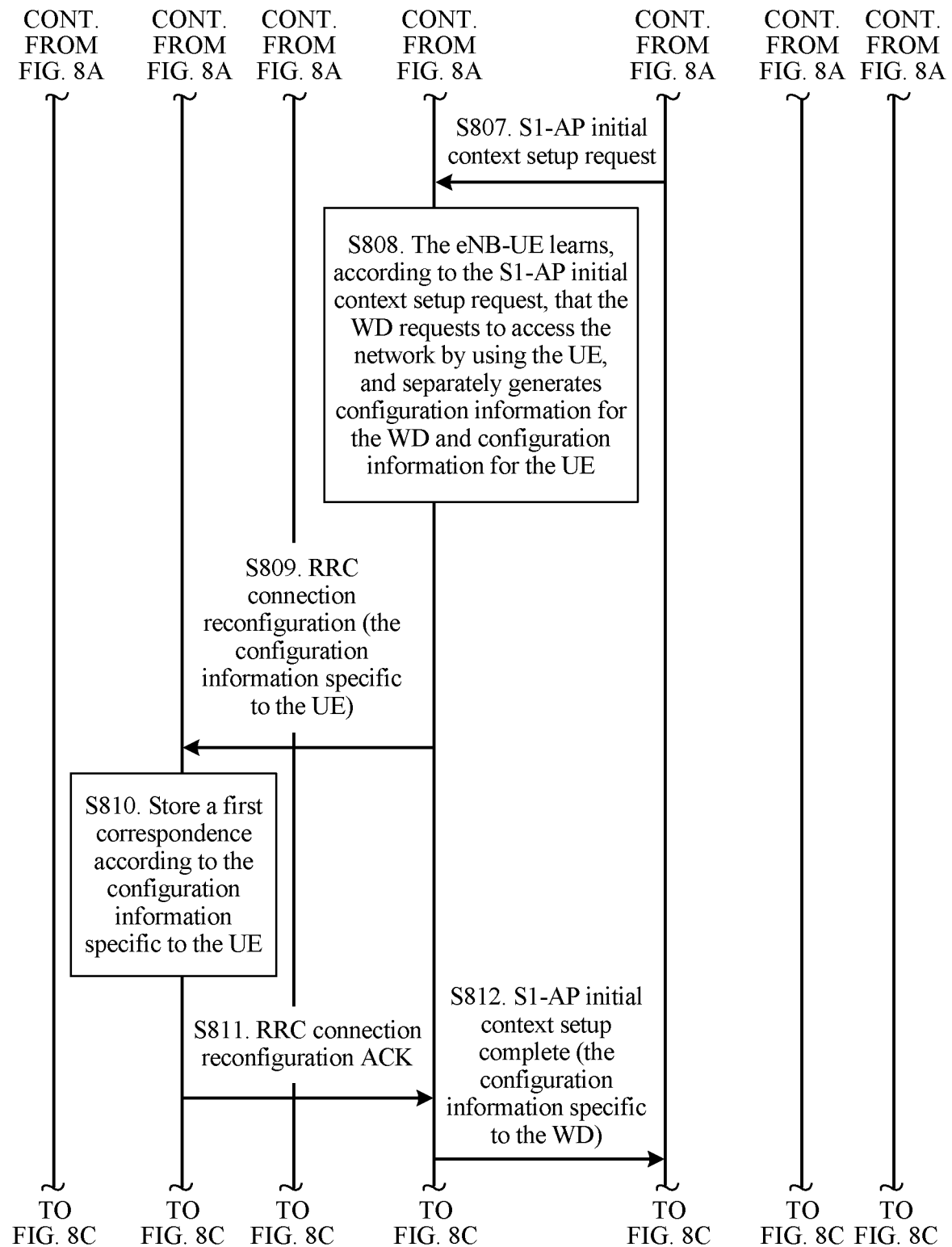
Figure 8C:
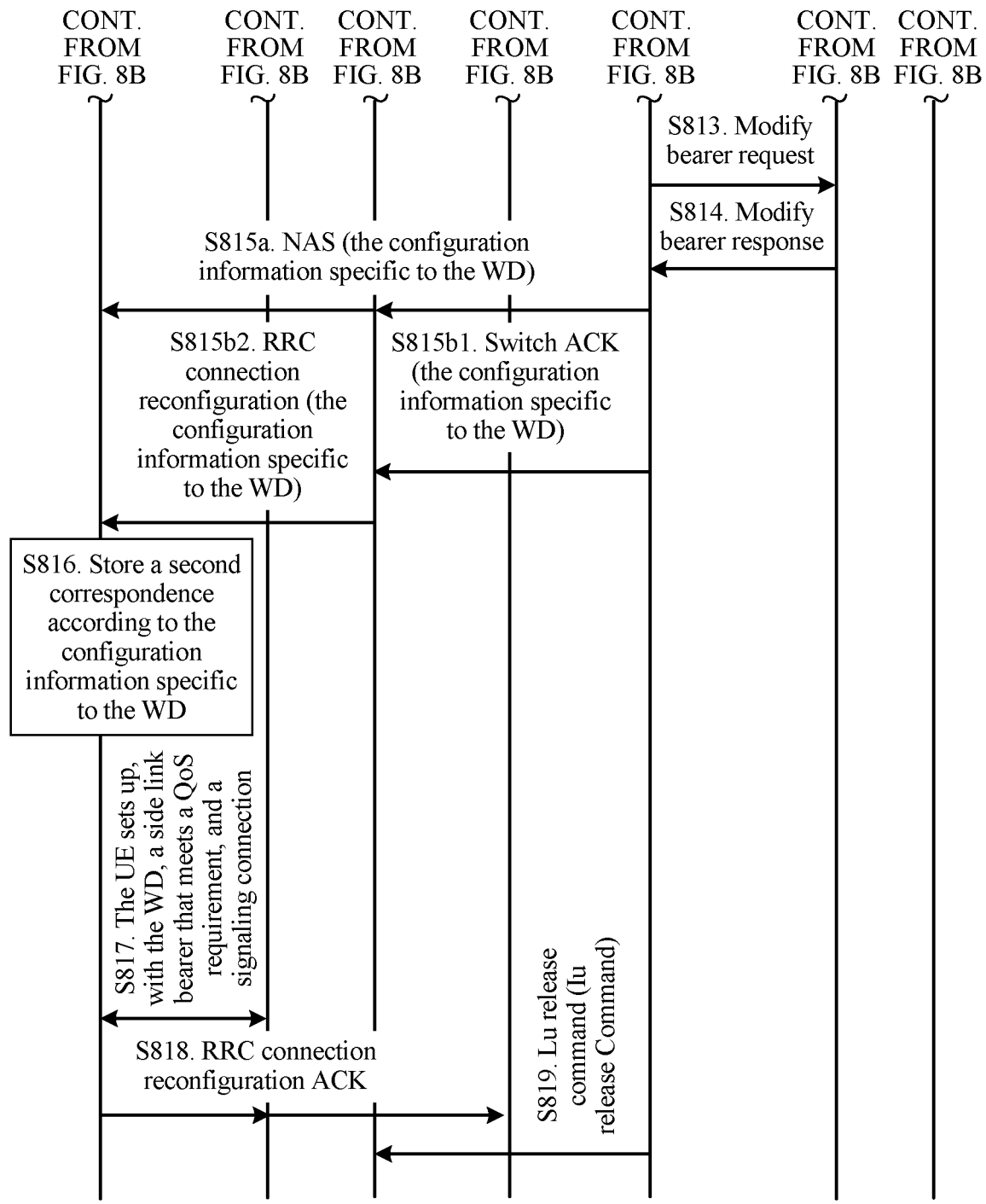
Figure 9A:
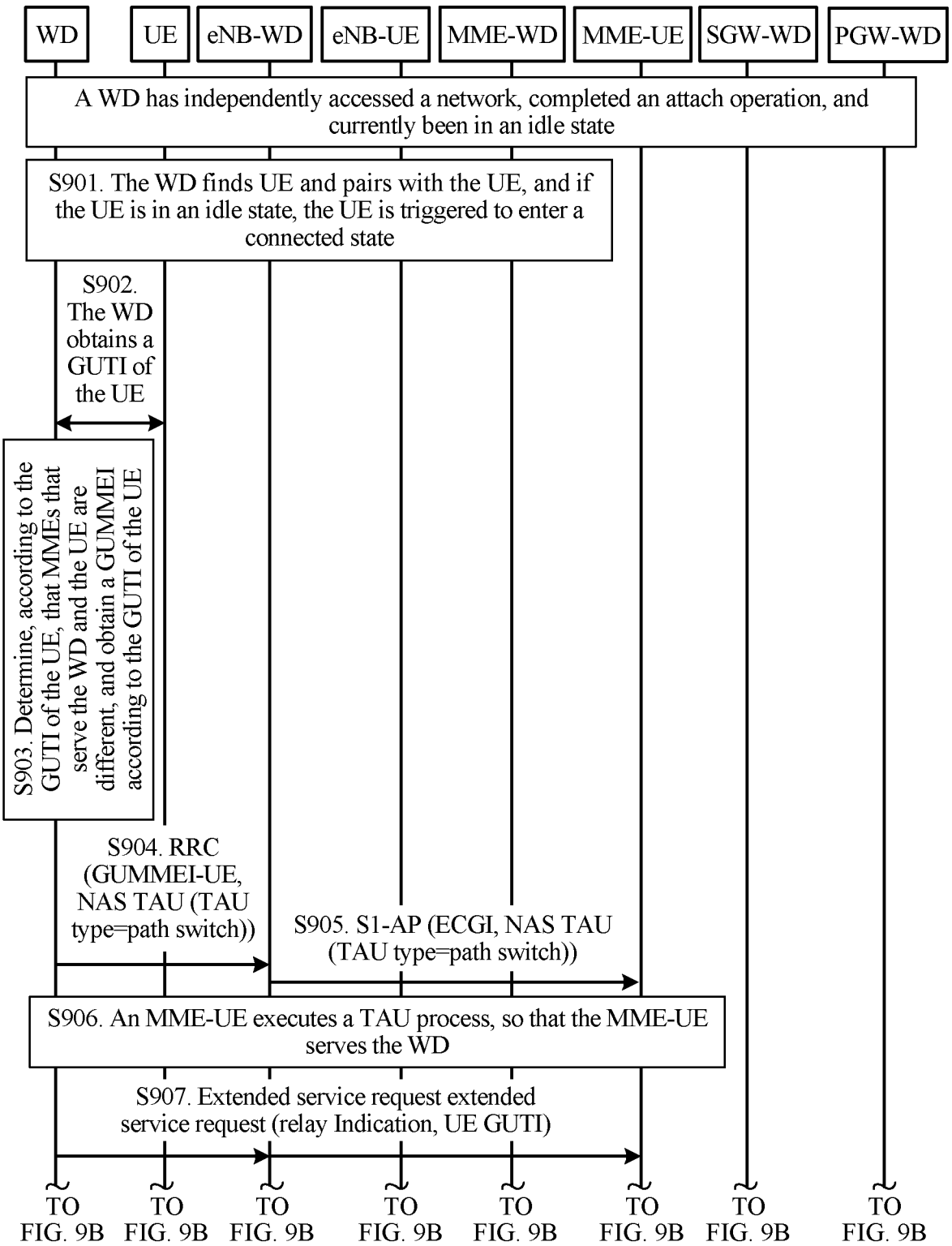
FIG. 9A, FIG. 9B, FIG. 9C, and FIG. 9D are a specific flowchart 2 of switching a WD in an idle state from a direct path for independently accessing a network to an indirect path for accessing the network by using UE according to an embodiment of the present invention.
Figure 9B:
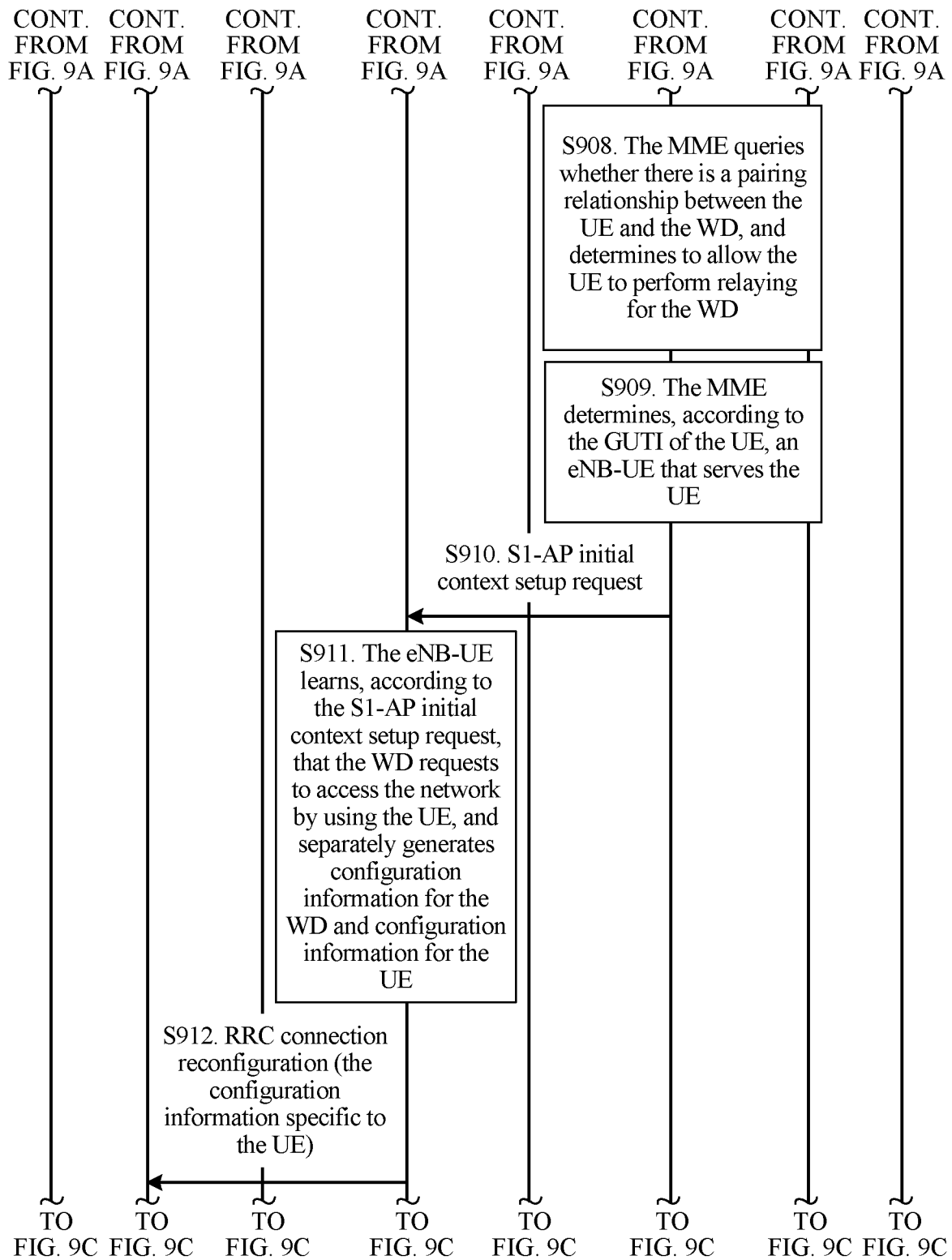
Figure 9C:
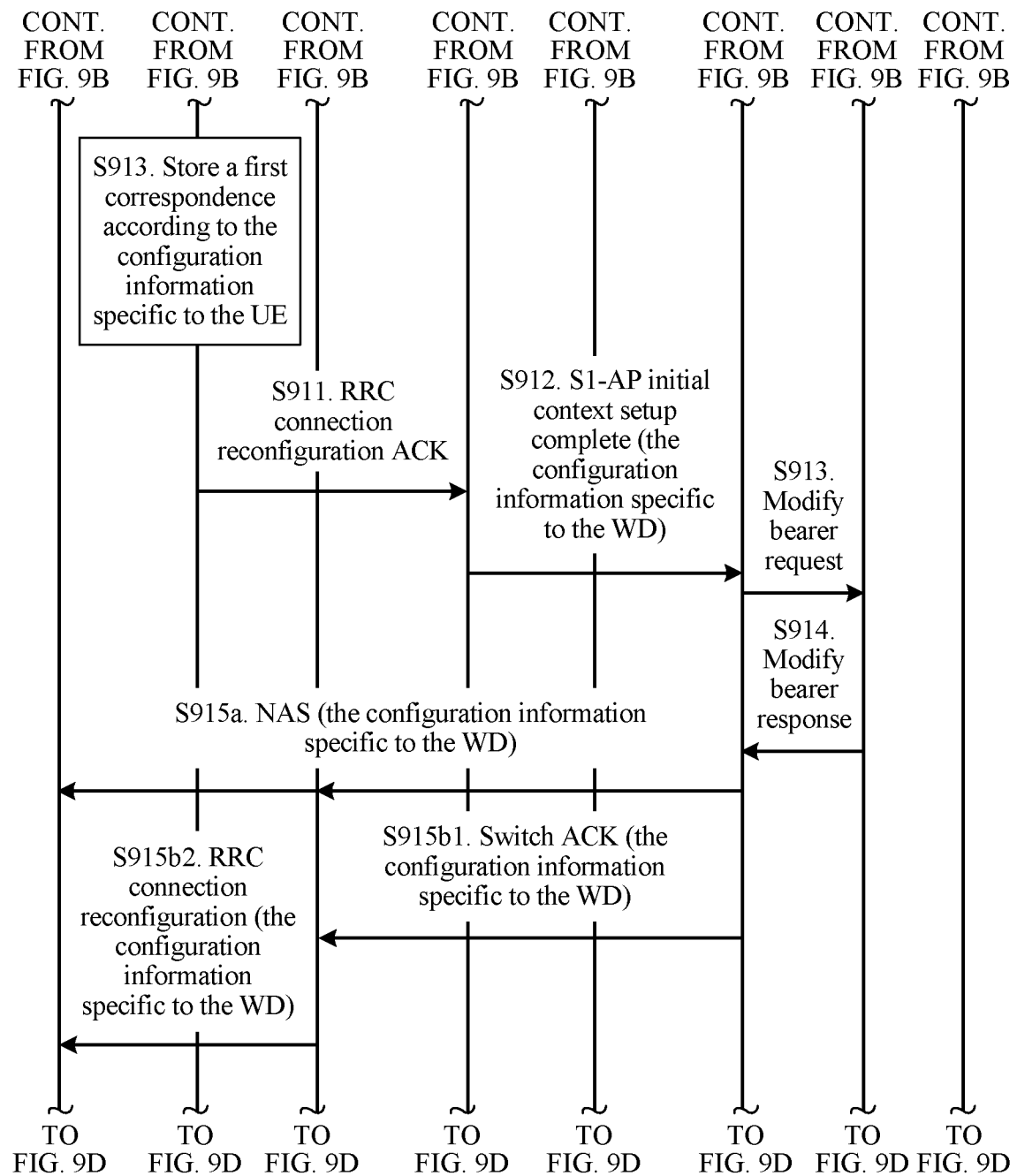
Figure 9D:
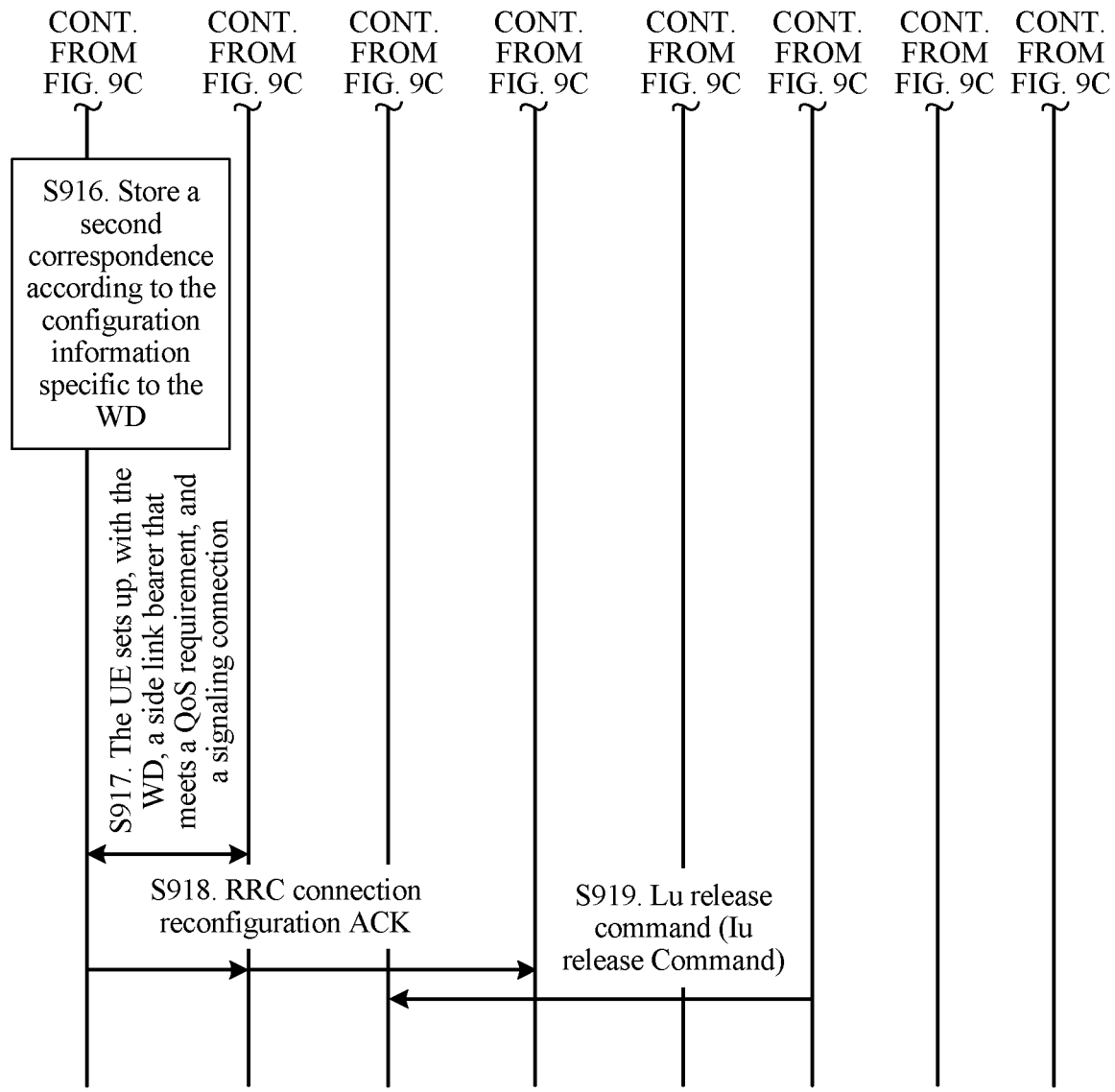
Figure 10A:
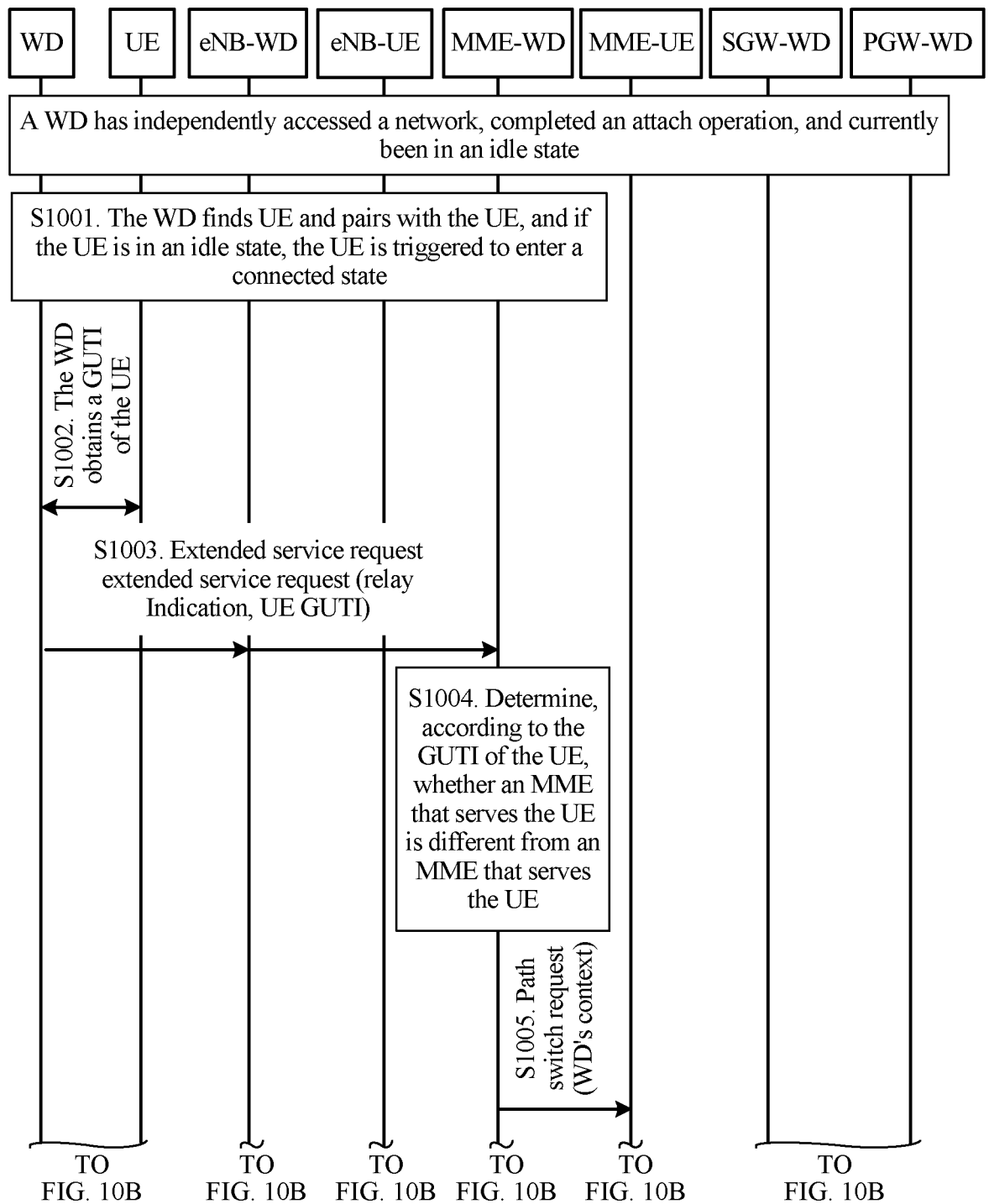
FIG. 10A, FIG. 10B, FIG. 10C, and FIG. 10D are a specific flowchart 3 of switching a WD in an idle state from a direct path for independently accessing a network to an indirect path for accessing the network by using UE according to an embodiment of the present invention.
Figure 10B:
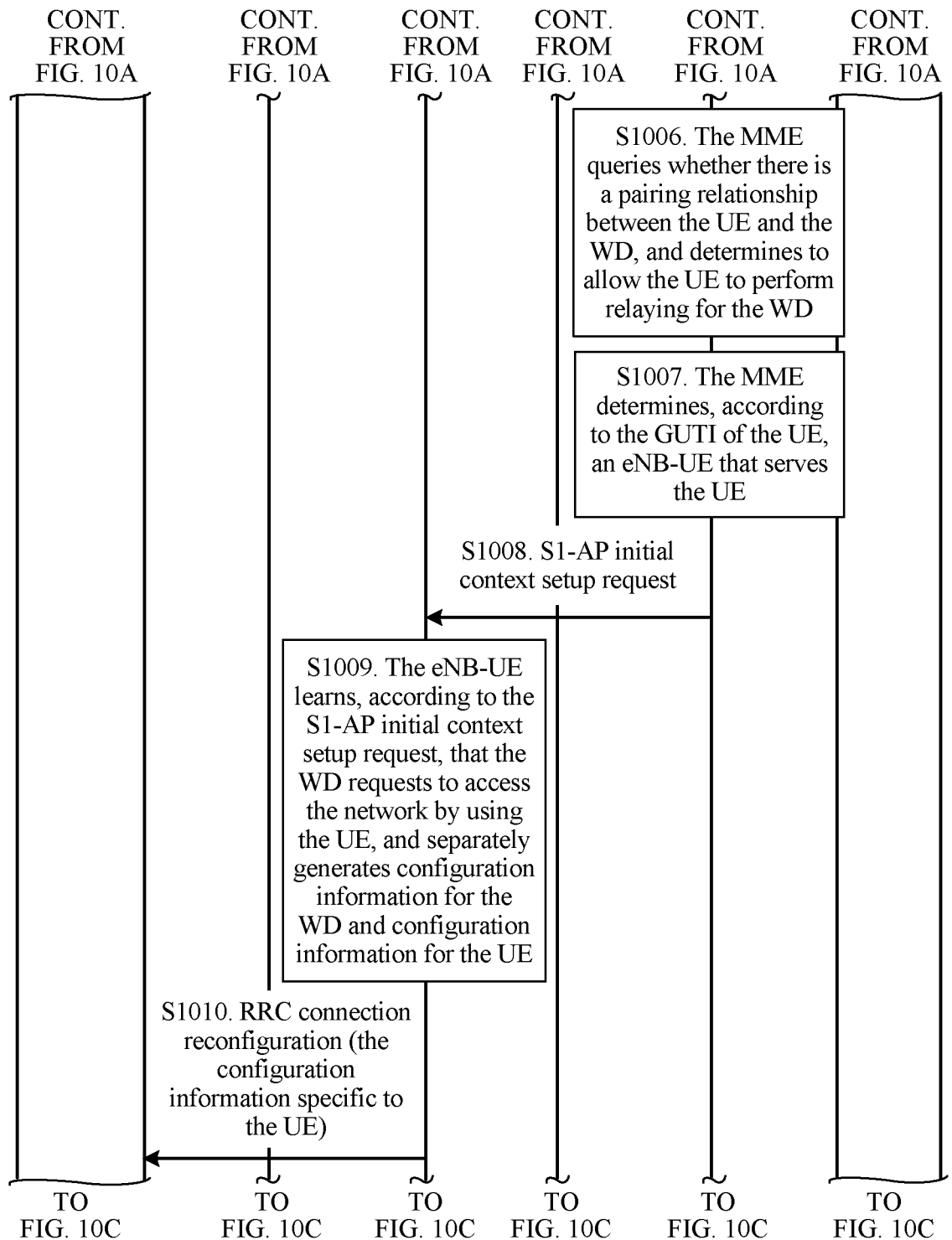
Figure 10C:
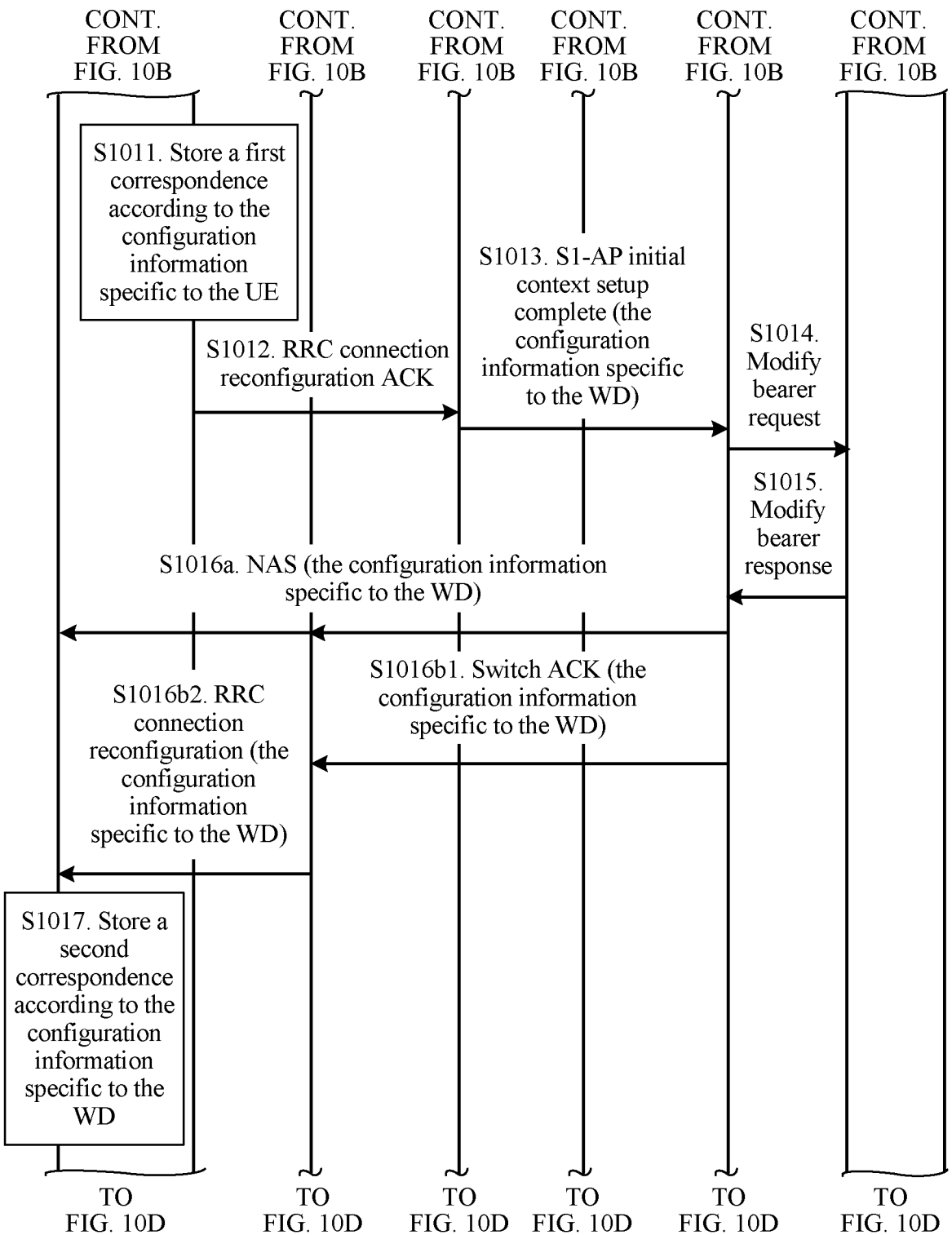
Figure 10D:
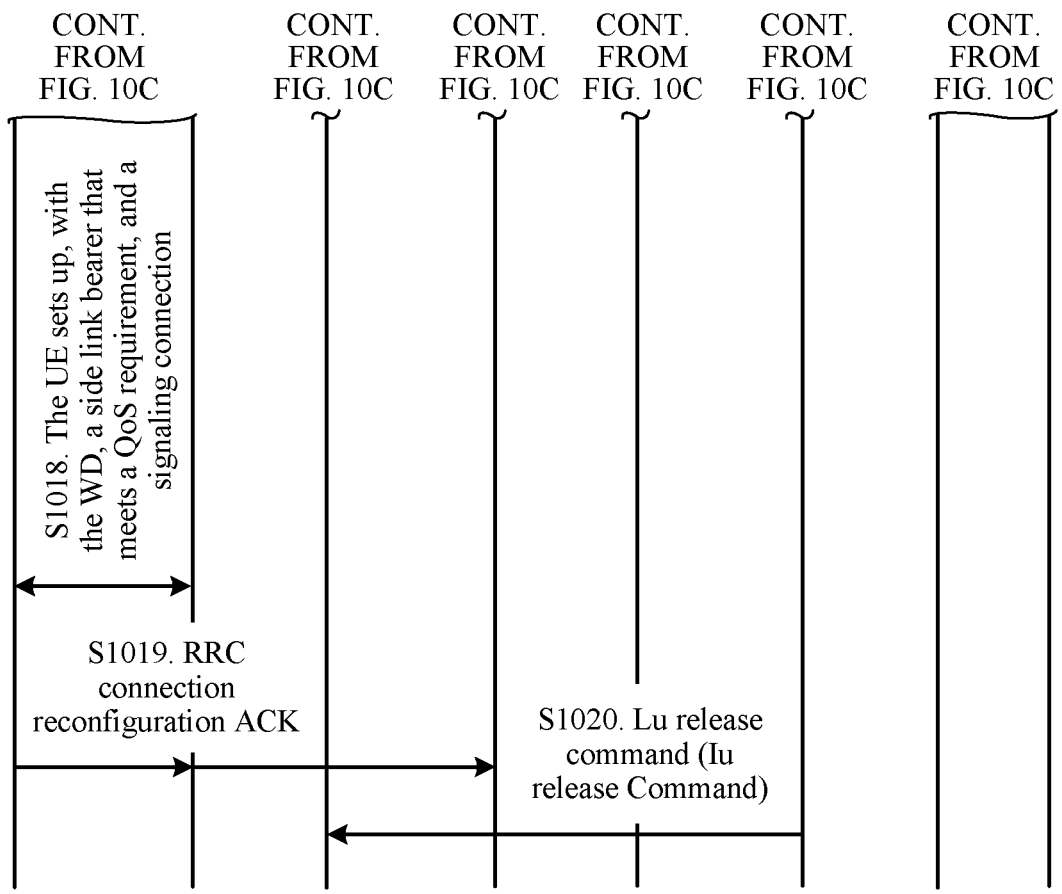

Referring to FIG. 8A, FIG. 8B, and FIG. 8C, it is assumed that the first terminal is a WD, the second terminal is UE, eNBs on which the WD and the UE camp are different and are respectively an eNB-WD and an eNB-UE, and a same MME serves the WD and the UE. A specific process in which the WD switches, in an idle (idle) state, from a first path (that is, a direct path) for independently accessing the network to a second path (that is, an indirect path) for accessing the network by using the UE is as follows:

Before the WD performs communication path switching, the WD has independently accessed the network, completed an attach operation, and currently been in the idle (idle) state.

S801. The WD finds the UE and pairs with the UE.

If the UE is in an idle state, the UE is triggered to enter a connected state.

S802. The WD obtains a GUTI and a cell ID of the UE.

S803. The WD determines, according to the GUTI of the UE, that the same MME serves the WD and the UE.

S804. When determining that the WD needs to set up the indirect path for accessing the network by using the UE, the WD sends an extended service request (Extended Service Request) message to the MME.

The message includes a relay indication and the GUTI of the UE.

Optionally, before sending the extended service request message, the WD may camp on, according to the cell ID of the UE, a cell in which the UE is located.

S805. After receiving the extended service request message, the MME queries whether there is a pairing relationship between the UE and the WD; and after determining that the UE is allowed to perform relaying for the WD, the MME performs step S806; or if the UE is not allowed to perform relaying for the WD, the procedure ends.

S805 is an optional step, and may not be performed.

S806. The MME determines, according to the GUTI of the UE, the eNB-UE that serves the UE.

S807. The MME sends an S1-AP initial context setup request (Initial Context Setup Request) message to the eNB-UE.

The request includes the following parameters: an ID of the WD, a list of (an EBI of the WD and QoS of an EPS bearer), the relay indication, and an ID of the UE. When the WD is in the idle state, the eNB-UE does not have context information of the WD. Herein, the list of (the EBI of the WD and the QoS of the EPS bearer) is carried to notify the eNB-UE of bearers of the WD.

S808. The eNB-UE learns, according to the S1-AP initial context setup request message, that the WD requests to access the network by using the UE, and separately generates configuration information for the UE and configuration information for the WD.

S809. The eNB-UE sends an RRC connection reconfiguration (RRC connection Reconfiguration) message to the UE.

The RRC connection reconfiguration message carries the configuration information specific to the UE.

S810. After receiving the RRC connection reconfiguration message, the UE stores a first correspondence according to the configuration information specific to the UE.

S811. The UE returns an RRC connection reconfiguration acknowledgement (RRC connection Reconfiguration ACK) message to the eNB-UE.

S812. The eNB-UE sends an S1-AP initial context setup complete (Initial Context Setup Complete) message to the MME.

The message carries the configuration information specific to the WD. The configuration information specific to the WD may be sent by using a container.

S813. The MME sends a modify bearer request message to an SGW.

The message is used to set up a connection between the eNB-UE and the SGW for the WD.

S814. The MME returns a modify bearer response message to the eNB-UE.

The message is used to notify the MME that the connection between the eNB-UE and the SGW is successfully set up for the WD.

S815 (a). The MME sends a non-access stratum (Non-access stratum, NAS) message to the WD, where the message carries an indication that the indirect path is successfully set up, and the configuration information specific to the WD.

S815 (b1). The MME sends a switch request acknowledgement (Switch Request ACK) message to the eNB-WD.

The message is used to notify the eNB-UE that the WD can access the network by using the indirect path, and the message carries the configuration information specific to the WD.

S815 (b2). The eNB-WD sends an RRC connection reconfiguration message to the WD.

The message carries the configuration information specific to the WD.

S815 (a), and S815 (b1) and S815 (b2) are two parallel solutions, and in a practical application process, one solution may be selected to notify the WD of the configuration information specific to the WD.

S816. The WD stores a second correspondence according to the configuration information specific to the WD.

S817. The UE sets up, with the WD, a side link bearer (Side link bearer) that meets a QoS requirement, and a signaling connection.

S818. The WD sends an RRC connection reconfiguration ACK message to the eNB-UE by using the UE.

The message is used to notify the eNB-UE that the WD completes switching from the direct path to the indirect path.

S819. The MME sends a release message to the eNB-WD.

The message is used so that the eNB-WD can release a connection to the WD.

Scenario 4

Referring to FIG. 9A, FIG. 9B, FIG. 9C, and FIG. 9D, it is assumed that the first terminal is a WD, the second terminal is UE, eNBs on which the WD and the UE camp are different and are respectively an eNB-WD and an eNB-UE, and different MMEs serve the WD and the UE and are respectively an MME-WD and an MME-UE. A specific process in which the WD switches, in an idle (idle) state, from a first path (that is, a direct path) for independently accessing the network to a second path (that is, an indirect path) for accessing the network by using the UE is as follows:

Before the WD performs communication path switching, the WD has independently accessed the network, completed an attach operation, and currently been in the idle (idle) state.

S901. The WD finds the UE and pairs with the UE.

If the UE is in an idle state, the UE is triggered to enter a connected state.

S902. The WD obtains a GUTI and a cell ID of the UE.

S903. The WD determines, according to the GUTI of the UE, that the different MMEs serve the WD and the UE, and obtains a GUMMEI according to the GUTI of the UE.

S904. The WD sends an RRC message to the eNB-WD.

The message carries the GUMMEI obtained according to the GUTI of the UE, the RRC message also carries a NAS TAU message, the NAS TAU message carries a path switch indication, and the path switch indication is used to indicate that the WD requests to access the network by using another terminal.

S905. The eNB-WD receives the RRC message, determines the MME-UE according to the GUMMEI, and sends a NAS TAU message to the MME-UE.

S906. The MME-UE executes a TAU process, so that the MME-UE serves the WD.

S907. When determining that the WD needs to set up the indirect path for accessing the network by using the UE, the WD sends an extended service request (Extended Service Request) message to the MME-UE.

S908. After receiving the extended service request message, the MME-UE queries whether there is a pairing relationship between the UE and the WD, and determines whether the UE is allowed to perform relaying for the WD; and if the UE is allowed to perform relaying for the WD, the MME-UE performs S909; or if the UE is not allowed to perform relaying for the WD, the procedure ends.

When the different MMEs serve the WD and the UE, after S906 is performed, S907 and S908 may not be performed, and S909 is directly performed.

S909. The MME-UE determines, according to the GUTI of the UE, the eNB-UE that serves the UE.

S910 to S919 in a subsequent processing procedure in the embodiment shown in FIG. 9A, FIG. 9B, FIG. 9C, and FIG. 9D are the same as S807 to S819 in the embodiment shown in FIG. 8A, FIG. 8B, and FIG. 8C, and details are not described herein again.

Scenario 5

Referring to FIG. 10A, FIG. 10B, FIG. 10C, and FIG. 10D, it is assumed that the first terminal is a WD, the second terminal is UE, eNBs on which the WD and the UE camp are different and are respectively an eNB-WD and an eNB-UE, and different MMEs serve the WD and the UE and are respectively an MME-WD and an MME-UE. A specific process in which the WD switches, in an idle state, from a first path (that is, a direct path) for independently accessing the network to a second path (that is, an indirect path) for accessing the network by using the UE is as follows:

Before the WD performs communication path switching, the WD has independently accessed the network, completed an attach operation, and currently been in the idle state.

S1001. The WD finds the UE and pairs with the UE.

If the UE is in an idle state, the UE is triggered to enter a connected state.

S1002. The WD obtains a GUTI and a cell ID of the UE.

S1003. When determining that the WD needs to set up the indirect path for accessing the network by using the UE, the WD sends an extended service request message to the MME-WD.

The message includes a relay indication and the GUTI of the UE.

S1004. After receiving the extended service request message, the MME-WD determines, according to the GUTI of the UE, whether the MME that serves the UE is different from the MME that serves the UE.

S1005. The MME-WD sends a path switch request (Path Switch Request) message to the MME-UE.

The message includes context information of the WD, and the message is used to request the MME-UE to serve the WD.

S1006. The MME-UE queries whether there is a pairing relationship between the UE and the WD, and determines whether the UE is allowed to perform relaying for the WD; and if the MME-UE determines that the UE is allowed to perform relaying for the WD, the MME-UE performs S1007; or if the UE is not allowed to perform relaying for the WD, the procedure ends.

S1006 is an optional step, and may not be performed.

S1007. The MME-UE determines, according to the GUTI of the UE, the eNB-UE that serves the UE.

S1008 to S1020 in a subsequent processing procedure in the embodiment shown in FIG. 10A, FIG. 10B, FIG. 10C, and FIG. 10D are the same as S807 to S819 in the embodiment shown in FIG. 8A, FIG. 8B, and FIG. 8C, and details are not described herein again.

Based on a same inventive concept, the embodiments of the present invention further provide a communication path switching device corresponding to the first base station in the embodiment shown in FIG. 2. The device may be configured to execute the method embodiment corresponding to FIG. 2. Therefore, for an implementation of the communication path switching device provided in the embodiments of the present invention, refer to the implementation of the method, and no repeated description is provided.

Figure 11:
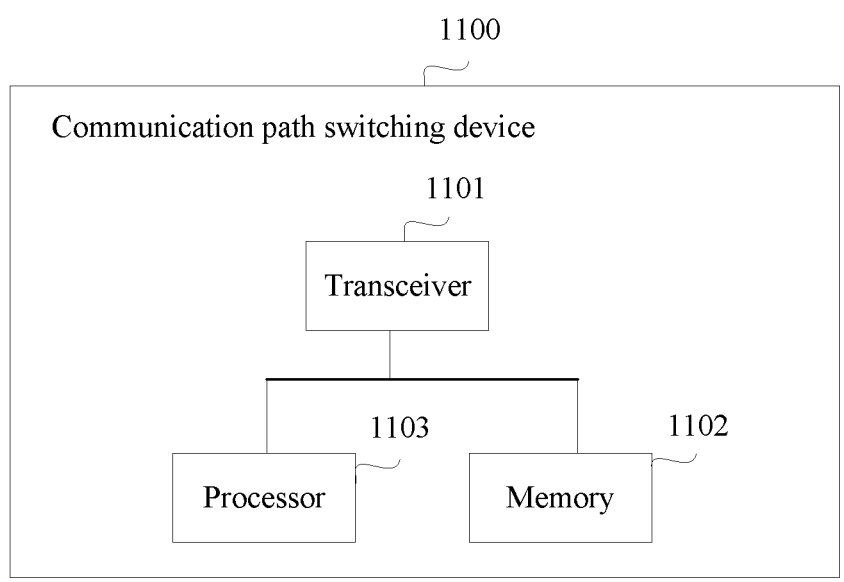
FIG. 11 is a schematic structural diagram 1 of a communication path switching device according to an embodiment of the present invention.

Referring to FIG. 11, an embodiment of the present invention provides a communication path switching device 1100, and the communication path switching device 1100 includes:

a transceiver 1101;

a memory 1102, configured to store an instruction; and a processor 1103, separately connected to the transceiver 1101 and the memory 1102, and configured to perform the following operations according to the instruction stored in the memory 1102:

receiving a first message sent by a first terminal, where the first message is used to request to switch the first terminal from a first path for independently accessing a network to a second path for accessing the network by using a second terminal, and the device serves the first terminal;

determining, according to the first message, a second base station that serves the second terminal;

obtaining configuration information from the second base station, where the configuration information is used by the first terminal to access the network by using the second terminal; and sending the configuration information to the first terminal.

In an optional design, the first message includes a cell identifier of a cell in which the second terminal is located.

In an optional design, the first message further includes an identifier of the second terminal, and the identifier of the second terminal is used by the second base station to determine the second terminal and configure the second terminal, so that the first terminal can access the network by using the second terminal.

In an optional design, the processor 1103 is configured to:

when determining, according to the first message, the second base station that serves the second terminal, determine the second base station according to the cell identifier of the cell in which the second terminal is located.

In an optional design, the processor 1103 is configured to:

when obtaining the configuration information from the second base station, send a second message to the second base station, where the second message is used to notify the second base station that the first terminal requests to access the network by using the second terminal; and receive the configuration information sent by the second base station, where the configuration information is generated by the second terminal for the first terminal.

In an optional design, the second message includes switch indication information and the identifier of the second terminal, and the switch indication information is used to indicate that the first terminal requests to access the network by using another terminal.

In an optional design, the processor 1103 is configured to:

when obtaining the configuration information from the second base station, send a third message to an MME that serves the first terminal, where the third message is used to notify the MME that the first terminal requests to access the network by using the second terminal; and receive the configuration information sent by the MME that serves the first terminal, where the configuration information is obtained from the second base station by the MME that serves the first terminal.

In an optional design, the third message includes the switch indication information and the identifier of the second terminal.

In an optional design, that the configuration information is obtained from the second base station by the MME that serves the first terminal includes:

the MME that serves the first terminal sends, according to the identifier of the second terminal, a fourth message to an MME that serves the second terminal, where the fourth message is used to cause the MME that serves the second terminal to send a fifth message to the second base station, and the fifth message is used to notify the second base station that the first terminal requests to access the network by using the second terminal; and the MME that serves the first terminal receives the configuration information sent by the second base station by using the MME that serves the second terminal, where the configuration information is generated by the second terminal for the first terminal.

In an optional design, the identifier of the second terminal includes a GUTI of the second terminal, or an S-TMSI of the second terminal, or a temporary identifier allocated by the second base station to the second terminal.

Based on a same inventive concept, the embodiments of the present invention further provide a communication path switching device corresponding to the first terminal in the embodiment shown in FIG. 2. The device may be configured to execute the method embodiment corresponding to FIG. 2. Therefore, for an implementation of the communication path switching device provided in the embodiments of the present invention, refer to the implementation of the method, and no repeated description is provided.

Figure 12:
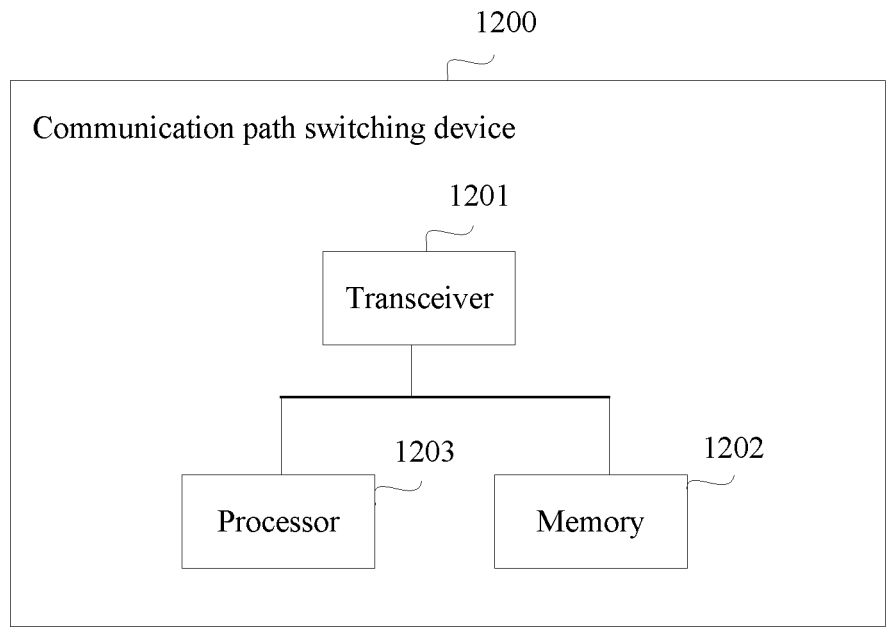
FIG. 12 is a schematic structural diagram 2 of a communication path switching device according to an embodiment of the present invention.

Referring to FIG. 12, a communication path switching device 1200 is provided, including:

a transceiver 1201;

a memory 1202, configured to store an instruction; and a processor 1203, separately connected to the transceiver 1201 and the memory 1202, and configured to perform the following operations according to the instruction stored in the memory 1202:

sending a first message to a first base station when determining that the device needs to switch from a first path for independently accessing a network to a second path for accessing the network by using the second terminal, where the first base station serves the device, and the first message is used to request to switch the device from the first path to the second path;

receiving configuration information sent by the first base station, where the configuration information is used by the device to access the network by using the second terminal, the configuration information is obtained by the first base station from a second base station, and the second base station serves the second terminal; and accessing the network by using the configuration information and the second terminal.

In an optional design, the processor 1203 is configured to:

before sending the first message to the first base station, obtain a cell identifier of a cell in which the second terminal is located, or a cell identifier of a cell in which the second terminal is located and an identifier of the second terminal.

In an optional design, the first message includes the cell identifier of the cell in which the second terminal is located.

In an optional design, the first message further includes the identifier of the second terminal, and the identifier of the second terminal is used by the second base station to determine the second terminal and configure the second terminal, so that the device can access the network by using the second terminal.

In an optional design, the processor 1203 is configured to:

when accessing the network by using the configuration information and the second terminal, set up a radio bearer with the second terminal according to radio resource information that is used by the device to set up the radio bearer with the second terminal and that is allocated by the second base station, where the configuration information includes the radio resource information.

In an optional design, the processor 1203 is further configured to:

after the device accesses the network by using the configuration information and the second terminal, send an acknowledgement message to the second base station by using the second terminal, where the acknowledgement message is used to notify the second base station that the device completes switching from the first path to the second path.

In an optional design, the identifier of the second terminal includes a GUTI of the second terminal, or an S-TMSI of the second terminal, or a temporary identifier allocated by the second base station to the second terminal.

Based on a same inventive concept, the embodiments of the present invention further provide a communication path switching device corresponding to the second base station in the embodiment shown in FIG. 2. The device may be configured to execute the method embodiment corresponding to FIG. 2. Therefore, for an implementation of the communication path switching device provided in the embodiments of the present invention, refer to the implementation of the method, and no repeated description is provided.

Figure 13:
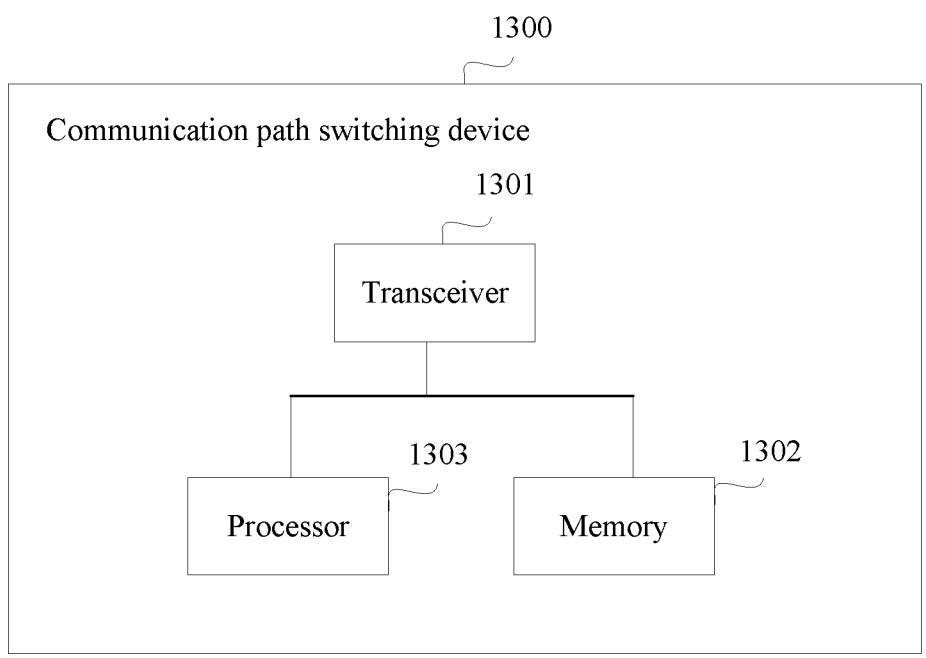
FIG. 13 is a schematic structural diagram 3 of a communication path switching device according to an embodiment of the present invention.

Referring to FIG. 13, an embodiment of the present invention provides a communication path switching device 1300, and the communication path switching device 1300 includes:

a transceiver 1301;

a memory 1302, configured to store an instruction; and a processor 1303, separately connected to the transceiver 1301 and the memory 1302, and configured to perform the following operations according to the instruction stored in the memory 1302:

learning that a first terminal requests to access a network by using a second terminal, where the device serves the second terminal;

generating configuration information for the first terminal, where the configuration information is used by the first terminal to access the network by using the second terminal; and notifying a first base station of the configuration information, where the first base station serves the first terminal.

In an optional design, the processor 1303 is configured to:

when learning that the first terminal requests to access the network by using the second terminal, receive a first message sent by the first base station, where the first message is used to notify the device that the first terminal requests to access the network by using the second terminal.

The notifying a first base station of the configuration information includes:

directly sending the configuration information to the first base station.

In an optional design, the first message includes switch indication information and an identifier of the second terminal, and the switch indication information is used to indicate that the first terminal requests to access the network by using another terminal.

In an optional design, the processor 1303 is configured to:

when learning that the first terminal requests to access the network by using the second terminal, receive a second message sent by an MME that serves the second terminal, where the second message is used to notify the device that the first terminal requests to access the network by using the second terminal, and the second message is obtained from the first base station by the MME that serves the second terminal.

The notifying a first base station of the configuration information includes:

sending the configuration information to the first base station by using an MME that serves the first terminal and the MME that serves the second terminal.

In an optional design, the second message includes the switch indication information and an identifier of the second terminal.

In an optional design, that the second message is obtained from the first base station by the MME that serves the second terminal includes:

the MME that serves the second terminal receives a third message sent by the MME that serves the first terminal, where the third message is sent after the MME that serves the first terminal receives a fourth message sent by the first base station, and the fourth message is used so that the MME that serves the first terminal can send, according to the identifier of the second terminal, the third message to the MME that serves the second terminal.

In an optional design, the processor 1303 is further configured to:

after learning that the first terminal requests to access the network by using the second terminal, and before generating, for the first terminal, the configuration information that is used by the first terminal to access the network by using the second terminal, send, to the MME that serves the second terminal, a request for allowing the first terminal to access the network by using the second terminal; and receive an acknowledgement message that is for allowing the first terminal to access the network by using the second terminal and that is sent by the MME that serves the second terminal.

In an optional design, the processor 1303 is further configured to:

after sending the configuration information to the first base station, receive an acknowledgement message sent by the first terminal by using the second terminal, where the acknowledgement message is used to notify the device that the first terminal completes switching from the first path to the second path.

In an optional design, the identifier of the second terminal includes a GUTI of the second terminal, or an S-TMSI of the second terminal, or a temporary identifier allocated by the device to the second terminal.

Based on a same inventive concept, the embodiments of the present invention further provide a communication path switching device corresponding to the MME in the embodiment shown in FIG. 7A and FIG. 7B. The device may be configured to execute the method embodiment corresponding to FIG. 7A and FIG. 7B. Therefore, for an implementation of the communication path switching device provided in the embodiments of the present invention, refer to the implementation of the method, and no repeated description is provided.

Figure 14:
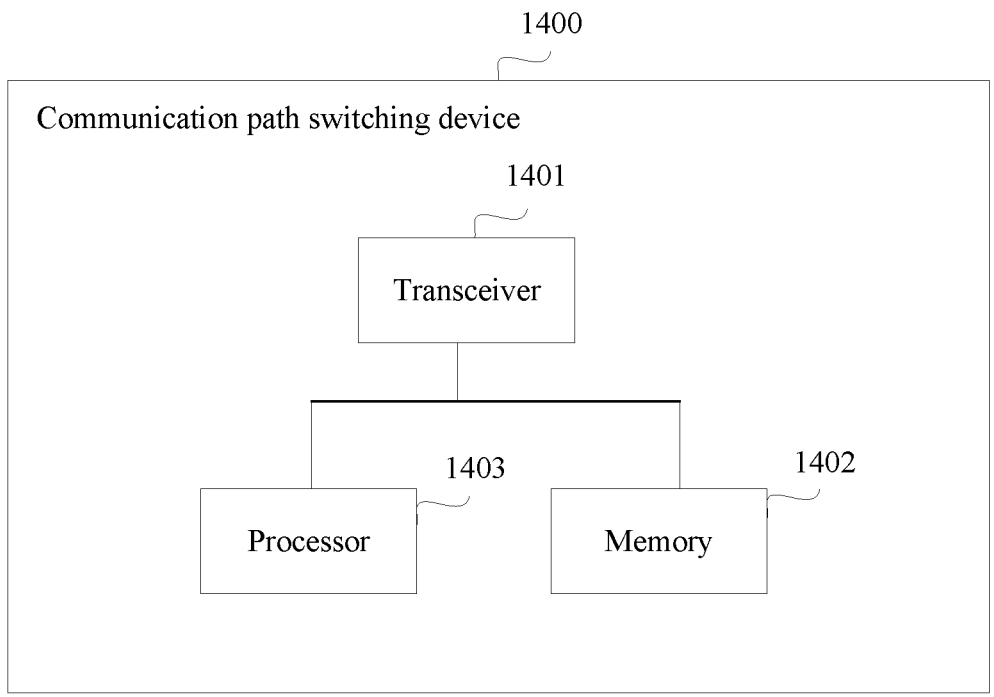
FIG. 14 is a schematic structural diagram 4 of a communication path switching device according to an embodiment of the present invention.

Referring to FIG. 14, a communication path switching device 1400 is provided, including:

a transceiver 1401;

a memory 1402, configured to store an instruction; and a processor 1403, separately connected to the transceiver 1401 and the memory 1402, and configured to perform the following operations according to the instruction stored in the memory 1402:

receiving a first message sent by a first terminal, where the first message includes switch indication information and an identifier of the second terminal, the device serves the first terminal, and the switch indication information is used to indicate that the first terminal requests to access a network by using another terminal;

determining, according to the identifier of the second terminal, a second base station that serves the second terminal, and sending a second message to the second base station, where the second message is used to notify the second base station that the first terminal requests to access the network by using the second terminal;

receiving configuration information sent by the second base station, where the configuration information is used by the first terminal to access the network by using the second terminal; and sending the configuration information to the first terminal.

In an optional design, the processor 1403 is further configured to:

when sending the configuration information to the first terminal, send a third message to the first terminal, where the third message carries the configuration information; or send the configuration information to the first terminal by using a first base station, where the first base station serves the first terminal.

In an optional design, the third message further carries switch acknowledgement indication information, and the switch acknowledgement indication information is used to indicate that the first terminal successfully sets up a second path for accessing the network by using the second terminal.

In an optional design, the processor 1403 is further configured to:

before sending the second message to the second base station, determine whether there is a pairing relationship between the second terminal and the first terminal, and if there is a pairing relationship between the second terminal and the first terminal, allow the first terminal to access the network by using the second terminal.

In an optional design, the processor 1403 is further configured to:

before receiving the first message sent by the first terminal, receive a fourth message sent by the first terminal by using the first base station, where the fourth message is used to request the device to serve the first terminal, and the fourth message is sent by the first terminal after the first terminal determines that the MME serving the first terminal is different from an MME serving the second terminal; and execute a tracking area update TAU process with the first terminal, so that the device serves the first terminal.

In an optional design, the identifier of the second terminal includes a GUTI of the second terminal, or an S-TMSI of the second terminal, or a temporary identifier allocated by the second base station to the second terminal.

Based on a same inventive concept, the embodiments of the present invention further provide a communication path switching device corresponding to the first terminal in the embodiment shown in FIG. 7A and FIG. 7B. The device may be configured to execute the method embodiment corresponding to FIG. 7A and FIG. 7B. Therefore, for an implementation of the communication path switching device provided in the embodiments of the present invention, refer to the implementation of the method, and no repeated description is provided.

Figure 15:
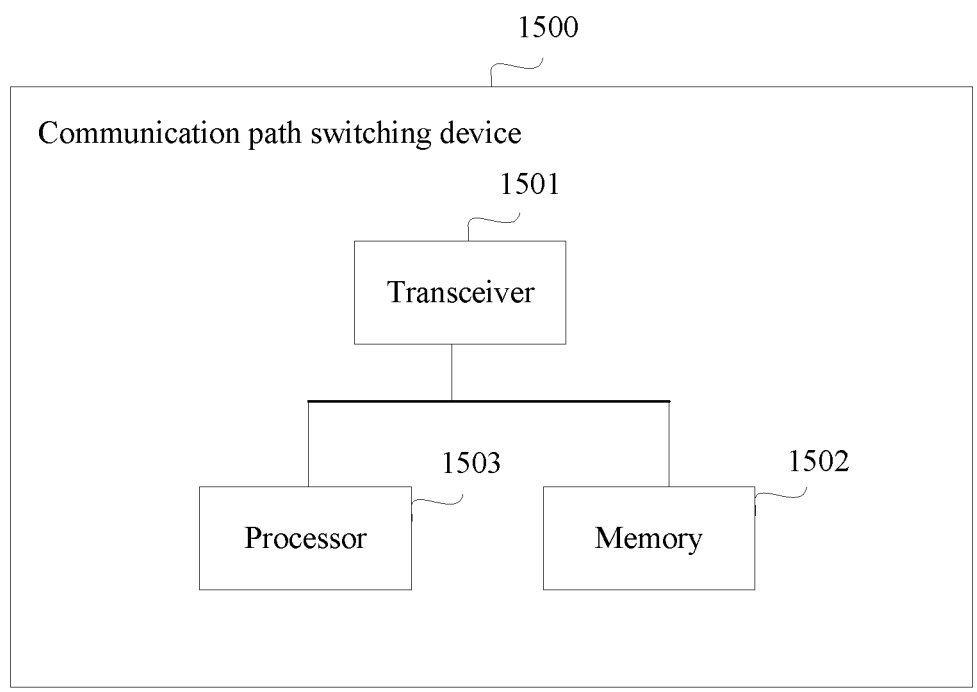
FIG. 15 is a schematic structural diagram 5 of a communication path switching device according to an embodiment of the present invention.

Referring to FIG. 15, a communication path switching device 1500 is provided, including:

a transceiver 1501;

a memory 1502, configured to store an instruction; and a processor 1503, separately connected to the transceiver 1501 and the memory 1502, and configured to perform the following operations according to the instruction stored in the memory 1502:

obtaining an identifier of a second terminal;

when determining, in an idle state, that the device needs to set up a second path for accessing a network by using the second terminal, sending a first message to an MME that serves the device, where the first message includes switch indication information and the identifier of the second terminal, and the switch indication information is used to indicate that the device requests to access the network by using another terminal;

receiving configuration information obtained from a second base station by the MME that serves the device, where the configuration information is used by the device to access the network by using the second terminal, and the second base station serves the second terminal; and accessing the network by using the configuration information and the second terminal.

In an optional design, the processor 1503 is configured to:

when sending the first message to the MME that serves the device, and determining, according to the identifier of the second terminal, that an MME that serves the second terminal is the same as the MME that serves the device, directly send the first message to the MME that serves the device.

In an optional design, the processor 1503 is configured to:

when sending the first message to the MME that serves the device, and determining, according to the identifier of the second terminal, that an MME that serves the second terminal is different from the MME that serves the device, send, by using a first base station, a second message to the MME that serves the second terminal, where the second message is used to request the MME that serves the second terminal to serve the device, and the first base station serves the device;

execute a tracking area update TAU process with the MME, so that the MME that serves the second terminal serves the device; and after determining that the MME that serves the second terminal serves the device, send the first message to the MME that serves the device.

In an optional design, the processor 1503 is configured to:

when sending, by using the first base station, the second message to the MME that serves the second terminal, send, to the first base station, an identifier of the MME that serves the second terminal, so that the first base station sends, according to the identifier of the MME that serves the second terminal, the second message to the MME that serves the second terminal; where the identifier of the MME that serves the second terminal is obtained by the device according to the identifier of the second terminal.

In an optional design, the second message is a tracking area update message, and an update type of the tracking area update message is path switching.

In an optional design, the processor 1503 is further configured to:

before sending the first message to the MME that serves the device, camp on, according to a cell identifier of a cell in which the second terminal is located, the cell corresponding to the cell identifier.

In an optional design, the processor 1503 is configured to:

when receiving the configuration information obtained from the second base station by the MME that serves the device, receive a third message sent by the MME that serves the second terminal, where the third message carries the configuration information; or receive the configuration information sent, by using the first base station, by the MME that serves the device.

In an optional design, the identifier of the second terminal includes a GUTI of the second terminal, or an S-TMSI of the second terminal, or a temporary identifier allocated by the second base station to the second terminal.

It should be noted that, a connection manner between parts shown in the foregoing device is only a possible example. Alternatively, both the transceiver and the memory are connected to the processor, and the transceiver is not connected to the memory, or another possible connection manner may be used.

In the method provided in the embodiments of the present invention, in a plurality of complex scenarios, the first terminal can access the network more flexibly and reliably by using another terminal, thereby improving user experience and meeting a practical application requirement of a wearable device.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A communication path switching method, comprising:
obtaining, by a first terminal, a cell identifier of a cell in which a second terminal connected to a first network via a second base station of the first network is located, or the cell identifier of the cell in which the second terminal is located and an identifier of the second terminal, wherein the identifier of the second terminal comprises a globally unique temporary identity (GUTI) of the second terminal, an S-temporary mobile subscriber identity (S-TMSI) of the second terminal, or a temporary identifier allocated by the second base station to the second terminal;

sending, by the first terminal, a first message to a first base station of the first network, wherein the first message requests to switch from a first path for the first terminal to independently access the first network using the first base station to a second path for the first terminal to access the first network using the second terminal, and wherein the first base station serves the first terminal and the second base station serves the second terminal;

receiving, by the first terminal from the first base station, configuration information obtained from the second base station and enabling the first terminal to access the first network using the second terminal and the second base station; and accessing, by the first terminal, the first network using the configuration information and the second terminal by setting up, by the first terminal, a radio bearer with the second terminal according to radio resource information allocated by the second base station.

2. The method of claim 1, wherein the first message comprises the cell identifier of the cell in which the second terminal is located.

3. The method of claim 1, wherein the first message comprises the identifier of the second terminal, and wherein the identifier of the second terminal enables the second base station to determine the second terminal and to configure the second terminal to enable the first terminal to access the first network using the second terminal.

4. The method of claim 1, wherein the configuration information comprises the radio resource information.

5. A first terminal, comprising:
a transceiver;
a memory configured to store one or more instructions; and
a processor coupled to the transceiver and the memory and configured to execute the one or more instructions to cause the processor to:
obtain a cell identifier of a cell in which a second terminal connected to a first network via a second base station of the first network is located, or the cell identifier of the cell in which the second terminal is located and an identifier of the second terminal, wherein the identifier of the second terminal comprises a globally unique temporary identity (GUTI) of the second terminal, an S-temporary mobile subscriber identity (S-TMSI) of the second terminal, or a temporary identifier allocated by the second base station to the second terminal;
send, using the transceiver, a first message to a first base station of the first network, wherein the first message requests to switch the first terminal from a first path for the first terminal to independently access the first network to a second path for the first terminal to access the first network using the second terminal;
receive, using the transceiver and from the first base station, configuration information obtained from the second base station, the configuration information enabling the first terminal to access the first network using the second terminal; and
access the first network using the configuration information and the second terminal by setting up a radio bearer with the second terminal according to radio resource information allocated by the second base station.

6. The first terminal of claim 5, wherein the first message comprises the cell identifier of the cell in which the second terminal is located.

7. The first terminal of claim 5, wherein the first message comprises the identifier of the second terminal, and the identifier of the second terminal enabling the second base station to determine the second terminal and to configure the second terminal to enable the device to access the first network using the second terminal.

8. The first terminal of claim 5, wherein the configuration information comprises the radio resource information.

9. A communication path switching method, comprising:
obtaining, by a first terminal, a cell identifier of a cell in which a second terminal is located, or the cell identifier of the cell in which the second terminal is located and an identifier of the second terminal;
sending, by the first terminal, a first message to a first base station when the first terminal needs to switch from a first path for independently accessing a network to a second path for accessing the network using the second terminal, wherein the first base station serves the first terminal, wherein the first message requests to switch the first terminal from the first path to the second path, and wherein the first message comprises the identifier of the second terminal;
receiving, by the first terminal, configuration information from the first base station, wherein the configuration information enables the first terminal to access the network using the second terminal, wherein the configuration information is obtained by the first base station from a second base station that serves the second terminal, and wherein the identifier of the second terminal enables the second base station to determine the second terminal and to configure the second terminal to enable the first terminal to access the network using the second terminal; and
accessing, by the first terminal, the network using the configuration information and the second terminal,
wherein the identifier of the second terminal comprises a globally unique temporary identity (GUTI) of the second terminal, an S-temporary mobile subscriber identity (S-TMSI) of the second terminal, or a temporary identifier allocated by the second base station to the second terminal.

10. The method of claim 9, wherein the first message further comprises the cell identifier of the cell in which the second terminal is located.

11. The method of claim 9, wherein the configuration information comprises the radio resource information.

12. The method of claim 9, wherein the identifier of the second terminal comprises the GUTI of the second terminal.

13. A first terminal, comprising:
a transceiver;
a memory configured to store one or more instructions; and
a processor coupled to the transceiver and the memory and configured to execute the one or more instructions to cause the processor to:
obtain, by a first terminal, a cell identifier of a cell in which a second terminal is located, or the cell identifier of the cell in which the second terminal is located and an identifier of the second terminal;
send, by the first terminal, a first message to a first base station when the first terminal needs to switch from a first path for independently accessing a network to a second path for accessing the network using the second terminal, wherein the first base station serves the first terminal, wherein the first message requests to switch the first terminal from the first path to the second path, and wherein the first message comprises the identifier of the second terminal;

receive, by the first terminal, configuration information from the first base station, wherein the configuration information enables the first terminal to access the network using the second terminal, wherein the configuration information is obtained by the first base station from a second base station that serves the second terminal, and wherein the identifier of the second terminal enables the second base station to determine the second terminal and to configure the second terminal to enable the first terminal to access the network using the second terminal; and access, by the first terminal, the network using the configuration information and the second terminal, wherein the identifier of the second terminal comprises a globally unique temporary identity (GUTI) of the second terminal, an S-temporary mobile subscriber identity (S-TMSI) of the second terminal, or a temporary identifier allocated by the second base station to the second terminal.

14. The first terminal of claim 13, wherein the first message further comprises the cell identifier of the cell in which the second terminal is located.

15. The first terminal of claim 13, wherein the configuration information comprises the radio resource information.

16. The first terminal of claim 13, wherein the identifier of the second terminal comprises the temporary identifier allocated by the second base station to the second terminal.

* * * * *